United States Patent [19]

Watanabe

[11] Patent Number: 5,539,532
[45] Date of Patent: Jul. 23, 1996

[54] IMAGE READING APPARATUS WITH VARIED SUBSCANNING SPEED

[75] Inventor: Hideaki Watanabe, Tokyo, Japan

[73] Assignee: NEC Corporation, Tokyo, Japan

[21] Appl. No.: 288,901

[22] Filed: Aug. 11, 1994

[30] Foreign Application Priority Data

Aug. 12, 1993 [JP] Japan .................................. 5-199851
Jun. 3, 1994 [JP] Japan .................................. 6-121637

[51] Int. Cl.⁶ .......................... H04N 1/04; H04N 1/047; H04N 1/10; H04N 1/17; H04N 1/191
[52] U.S. Cl. ......................... 358/443; 358/444; 358/447; 358/471; 358/486; 358/494
[58] Field of Search ..................................... 358/406, 471, 358/473, 474, 486, 487, 494, 497, 496, 443, 444, 447

[56] References Cited

U.S. PATENT DOCUMENTS

| | | | |
|---|---|---|---|
| 4,641,357 | 2/1987 | Satoh | 358/497 |
| 4,860,377 | 8/1989 | Ishigaki | 358/494 |

FOREIGN PATENT DOCUMENTS

| | | |
|---|---|---|
| 60-233974 | 11/1985 | Japan . |
| 62-61182 | 3/1987 | Japan . |
| 500553 | 2/1989 | Japan . |
| 34713 | 5/1991 | Japan . |

*Primary Examiner*—Scott A. Rogers
*Attorney, Agent, or Firm*—Whitham, Curtis, Whitham & McGinn

[57] ABSTRACT

A scanner having an image sensor unit having a CCD linear array for electro-optically scanning an image of an original in a main scanning direction to convert the image into image data signals is used to scan, through a table sheet having a transparent document area and a pattern area which includes a stripe pattern inclined with respect to the main scanning direction, an original placed under the document area to read data of the original, and the scanner is moved relative to the original in a subscanning direction perpendicular to the main scanning direction. A pattern signal obtained by scanning the pattern area then is analyzed to detect an amount of relative movement of the scanner in the subscanning direction from the movement of the stripe pattern in the main scanning direction. Accordingly, the reading resolution in the subscanning direction which varies depending upon a high or low degree of the speed of relative movement of the scanner in the subscanning direction can be maintained suitably by adjustment of the speed of movement, or the reading speed can be raised for a predetermined resolution.

20 Claims, 24 Drawing Sheets

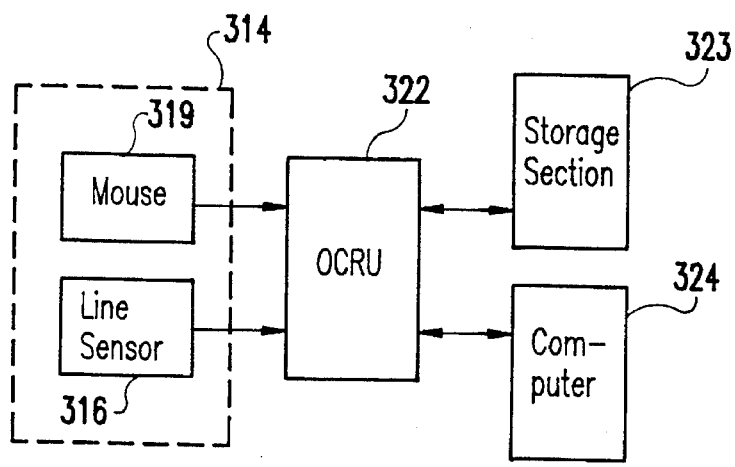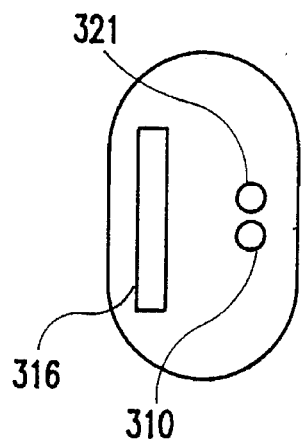
FIG.9A    FIG.9B
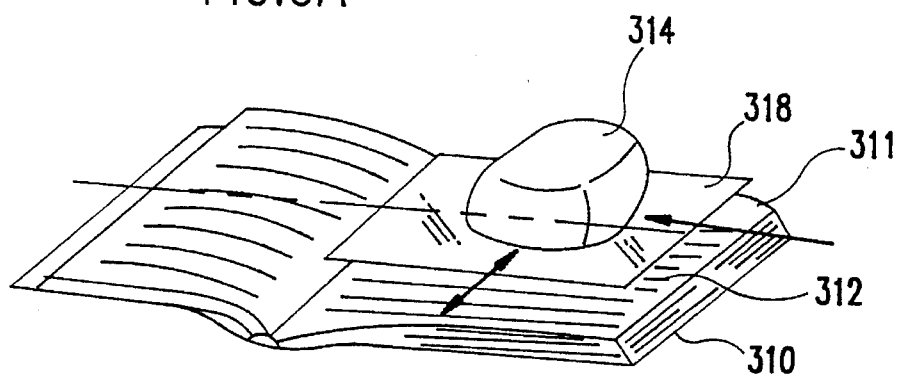
FIG.9C
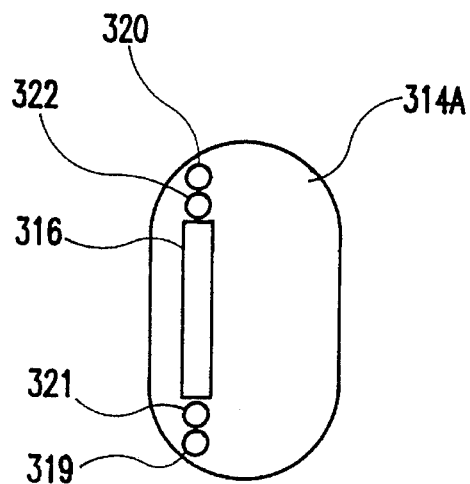
FIG.9D

IMAGE READING APPARATUS WITH VARIED SUBSCANNING SPEED

BACKGROUND OF THE INVENTION

1. Field of the Invention

This invention relates to an image reading apparatus, and more particularly to an image reading apparatus of the line scanner type wherein a solid-state image sensor such as a CCD linear array for electro-optically scanning in a main scanning direction is moved in a subscanning direction perpendicular to the main scanning direction to read an object image of a document or the like.

2. Description of the Related Art

An image reading apparatus of the line scanning type, that is, the line scanner type, wherein a reading head employing a one-dimensional photoelectric transducer element such as a CCD linear array sensor is moved relative to an object image of a document or the like to read the image is widely employed as an image data inputting apparatus of a facsimile apparatus, a computer or the like.

In an image reading apparatus of the type mentioned above, control means for establishing an accurate corresponding relationship between a reading timing of image data for one line in the main scanning direction photoelectrically converted by a reading head and an amount of the relative movement in the subscanning direction are required in order to reproduce an accurate image. As a first example of a conventional image reading apparatus wherein a positioning line code which is fixed relative to the image and moves relative to the reading head is provided as the control means and the line code is read by the reading head to detect the amount of movement, an image reading/recording apparatus is disclosed in Japanese Patent Laid-Open No. 233974/85.

Referring to FIG. 1(A) which shows the first example of a conventional image reading/recording apparatus in a block diagram and FIG. 1(B) which shows a cylinder section of FIG. 1(A) in detail, the image reading/recording apparatus includes recording cylinder 101 which rotates at a uniform speed with photosensitive member 102 wound therearound, recording head 104 which moves at a uniform speed along main scanning feed screw 105 parallel to an axis of rotation of recording cylinder 101, input apparatus 110, memory 109 for storing image data from input apparatus 110, controller 108, code cylinder 121 disposed in a coaxial and fixed relationship with cylinder 101 and having on a circumferential face thereof a line code forming a plurality of parallel lines inclined by a particular angle $\phi$ with respect to the direction of the axis thereof, and code reading head 122 which moves at a uniform speed of a fixed ratio to the speed of movement of recording head 104 along feed screw 124 parallel to the axis of code cylinder 121 and has sensor 152 for irradiating light beam 151 upon the line code and receiving reflected light from the line code.

The line code is formed from a single main line corresponding to a one rotation pulse which is generated in one rotation of cylinder 101 and N sublines corresponding to N pulses which are generated by N in the one rotation. Since code reading head 122 moves along feed screw in synchronism with rotation of cylinder 101 and code cylinder 121, the generation phases of the one rotation pulse and the N pulses for each one rotation of code cylinder 121 proceed gradually. Supposing the ratio between the feeding speed of recording head 104 and the feeding speed of code reading head 122 is n:1, while recording head 104 advances by distance L in the axial direction of cylinder 101 as shown in FIG. 1(C), code reading head 122 advances by L/n. Accordingly, where the direction perpendicular to recording direction Y of recording head 104 thus composed on cylinder 101 is represented by X, the relationship between angle $\theta$ between X and the axial direction of cylinder 101 and inclination angle $\phi$ of the line code with respect to the axial direction of code cylinder 121 is given by the following equation:

$\tan\phi = n\tan\theta$

Therefore, $\phi = \tan^{-1}(n\tan\theta)$

In response to the one rotation pulse and the N pulses obtained in this manner, controller 108 controls the speeds of rotation of recording cylinder 101 and feed screw 105 by way of motor controllers 112 and 111 and motors 103 and 106, respectively.

An image reading apparatus disclosed in Japanese Patent Publication No. 34713/91, which is a second example of a conventional image reading apparatus, includes an original table in the form of a flat plate which moves back and forth in a subscanning direction relative to an image scanning section to effect subscanning. A striped pattern having a preset inclination angle relative to a main scanning direction is provided at an end of the original table and is used to generate a reference signal for movement control in the subscanning direction.

Referring to FIG. 2 which shows an appearance of an original scanning section which is one of the principal components of the second example of the conventional image reading apparatus, the original scanning section shown includes document table 201 formed from a flat glass plate having reference mark 205 in the form of a stripe pattern formed by printing on a lower face at an end thereof and document area 202 for receiving original document 204 thereon, and a scanning section including lamp 206 for irradiating light upon original document 204 and mark 205, mirror 207, lens 208, and CCD unit 209 of the linear array type having 2,048 elements.

Referring to FIG. 3 which is a perspective view of document table 201 as viewed from an upper surface toward a lower surface of the same, reference mark 205 is a stripe pattern inclined by 45 degrees with respect to the main scanning direction. Part (128 elements) of the CCD unit is allocated to optical detection corresponding to reference mark 205. Those 192 elements on the opposite side to reference mark 205 are allocated to detection of a margin.

Referring to FIG. 4 which shows a circuit of the image scanning section in a block diagram, the image scanning section includes timing generation section 251 for generating a data clock and a scanning start signal, automatic gain control circuit 252 for amplifying data from the individual elements of CCD unit 209 to supply analog data, threshold level circuit 250 for outputting binary data corresponding to a preset threshold level for the analog data, stripe analysis circuit 254 for receiving the binary data supplied thereto, performing a stripe analysis and outputting a valid video data line signal, a valid data clock and a valid line signal, and gate circuit 253 for gating the binary data with the valid video data line signal.

In operation, reflected light from original document 204 on document table 201 and reference mark 205 is projected onto the 2,048 CCD elements of CCD unit 209 by way of mirror 207 and lens 208. In response to the data clock and the scanning start signal from timing generation circuit 251, CCD unit 209 performs sequential data reading operations beginning with the 0th CCD element and ending with the 2,047th CCD element and supplies the thus read data to automatic gain control circuit 252. Automatic gain control circuit 252 amplifies the data to supply analog data, and threshold level circuit 250 compares the analog data sequentially supplied thereto with the preset threshold level to produce binary data consisting of binary values comprising a white signal "0" equal to or higher than the threshold level and a black signal "1" lower than the threshold level. The binary data are supplied to gate circuit 253, and gate circuit 253 thus gates, in response to the valid video data line signal as described hereinafter, those 128th to the 2,047th element data of the binary data which correspond to document area 202 and the margins and outputs them to the video data line.

Meanwhile, stripe analysis circuit 254 receives, from an external control circuit (not shown) which is constituted from a microprocessor, a stripe sample-on signal indicative of whether the stripe analysis circuit is operative or inoperative and a first scanning line signal indicative of arrival of a first scanning line which is generated when an top end of a document is detected, and analyzes the 0th to 127th element data to detect whether or not document table 201 and original document 204 have moved a predetermined distance.

Referring to FIG. 3, FIGS. 5(A) and 5(B) illustrating details of reference mark 205 and the analyzing operation of stripe analysis circuit 254, respectively, mark 205 is a stripe pattern constituted from white stripes 205a and black stripes 205b and inclined by 45 degrees with respect to the main scanning direction, that is, the scanning direction of CCD unit 209, as described above, and has left side dummy area 241, detection area 242 and right side dummy area 243. Here, it is assumed that the resolution is 8 picture elements/mm in the main scanning direction and accordingly is also 8 picture elements/mm in the subscanning direction, that is, 8 picture element lines/mm. Accordingly, the size of each picture element is ⅛×⅛ mm. If the speed in the subscanning direction is an appropriate speed, that is, a nominal feeding speed, the distance between the picture element lines is kept at ⅛ mm. However, if the speed in the subscanning direction drops lower than the nominal feeding speed, then the distance between the picture element lines becomes smaller than ⅛ mm, and consequently, the picture element lines overlap with each other. Stripe analysis circuit 254 sets detection position DP in the form of a detection window of the one picture element size and discriminates, upon relative movement of document table 201 relative to the image scanning section in the subscanning direction, whether or not the distance between scanning lines reaches the dimension of the one picture element size, that is, ⅛ mm.

The initial position of detection position DP can be set to an arbitrary picture element position within detection area 242. Here, the initial position is set to picture element position 48 for the convenience of description.

Referring to FIG. 6 which is a processing flow chart of the second conventional example described above, subsequently to step 271 for setting of the initial position of detection position DP, it is checked at next step 272 to determine whether or not black, that is, a black picture element, is found out at detection position DP of picture element position 48. Since scanning lines L1 to L3 in FIG. 5(A) do not have a black picture element at picture element position 48, NO is outputted at step 272, and image data corresponding to scanning lines L1 to L3 are abandoned, that is, ignored and are not supplied to a buffer memory (step 273). In scanning line L4, a black picture element is detected at detection position DP and stripe detection pulse SD is produced. Here, at step 272, YES is outputted, and at step 273, current scanning line L4 is handled as a new scanning line and image data of scanning line L4 are supplied to the buffer memory. The fetching of the image data is performed by gating by gate circuit 253 with the valid video data line signal described above (step 274). If a black stripe is detected, detection position DP is shifted to next picture element position 49 (step 275).

Referring also to FIG. 5(B), the operation returns to step 272 again so that next scanning line L5 is checked similarly with picture element position 49 set as detection position DP, and since a black stripe is detected, stripe detection pulse SD is generated so that fetching of the image data and shifting of detection position SD to picture element position 50 are performed.

When similar processing is thereafter performed for next scanning line L6, since the distance between scanning lines L5 and L6 is smaller than the nominal distance of ⅛ mm due to a drop of the speed of relative movement of document table 201 relative to the image scanning section, the black stripe at detection position DP (picture element position 50) is not detected, and accordingly, no stripe detection pulse SD is produced and fetching of image data is not performed. For the same reason, fetching of image data is not performed with scanning line L7. Detection of a black stripe at detection position DP (picture element position 50) takes place successfully in scanning line L8, and fetching of image data and shifting of detection position DP to picture element position 51 are performed in response to stripe detection pulse SD.

In this manner, in the present image reading apparatus, following up the variation of the speed of relative movement of document table 201 relative to the field of view of the image scanning section, that is, CCD unit 209, image data of a scanning line whose relative distance from an adjacent line reaches the nominal distance of ⅛ mm are fetched.

Detection position DP is gradually shifted rightwardly, and when it reaches picture element position 63 at the right end of detection area 242, it is returned to picture element position 32 at the left end of detection area 242 as indicated in scanning lines Ln to Ln+2.

An image reading apparatus of the hand scanner type disclosed in Japanese Patent Laid-Open No. 61182/87, which is the third example of the conventional image reading apparatus, includes a hand scanner for reading, through a transparent sheet at a portion of which position information is recorded in the form of a bar code or some other form, an original placed on the light transmission sheet, and a processing device including detection means for detecting the position information from image information read by the hand scanner, calculation means for calculating a correction coefficient from the position information detected by the detection means, and conversion means for converting the image information using the correction coefficient obtained by the calculation means, and allows inputting of an accurate image of a large original by means of the sensor of a small size by simple operations.

Referring to FIG. 7 which shows an image reading condition of the third example in a perspective view, the image reading apparatus includes original 301 similar to that of the second example, transparent sheet 302 having position information recorded in the form of a bar code at the opposite ends thereof, hand scanner 303 having a built-in sensor for obtaining image information, and processing device 304 for processing the image information.

In operation, transparent sheet 302 is first placed onto original 301, and then, hand scanner 303 is pressed against transparent sheet 302 and scans it. Image information on original 301 and the position information on transparent sheet 302 are read by the built-in sensor of hand scanner 303 and sent to processing device 304.

Referring to FIGS. 8(A) to 8(C) illustrating the concept of the image information read by hand scanner 303, when hand scanner 303 is scanned in the direction of arrow X on original 301 and transparent sheet 302 as seen in FIG. 8(A), image information including image information portions 305 and 306 at the opposite end portions of such transparent sheet 302 as shown in FIG. 8(B) can be read. Processing device 304 detects the position information from the image information at image information portions 305 and 306. Where the position information detected from image information portions 305 and 306 is represented by P1 and P2, respectively, and the leftward and rightward distance between the positions of light transmission sheet 302 at which the position information is recorded is represented by 1, inclination angle θ of scanning of hand scanner 303 is given by the following equation:

$$\theta = \tan^{-1}(P2-P1)/1.$$

Processing device 304 executes this calculation to obtain angle θ and executes conversion scanning of inclining the image information read by the scanning by angle θ. As a result of this conversion scanning, even the image information inputted by such inclined scanning as seen from FIG. 8(A) or 8(B) is returned into original image information as seen from FIG. 8(C). The image information of original 301 can be read by repeating the inputting sequence several times.

In an image reading apparatus of the hand scanner type disclosed in Japanese Patent Laid-Open No. 500553/89 which is the fourth example of the conventional image reading apparatus, a transparent sheet including a position identification mark disposed on a page including a printed text or some other information is scanned so that the page may be crossed. The position identification mark is printed in different colors than that of any other information on the page across the transparent sheet while the other information on the page is printed, for example, in black. In this manner, while a position sensor which is sensitive to the color of the identification mark measures the position of the image reading apparatus relating to the page, a second sensor which is sensitive to the information color, that is, black, reads desired information from the page.

Referring to FIG. 9(A) which shows the fourth example in a block diagram, the image reading apparatus includes hand scanner 314 including line sensor 316 and optical mouse mechanism 319 for scanning a book to be read, optical character recognition unit (OCRU) 322, storage section 323 formed from a RAM, and computer 324.

Referring to FIG. 9(B) which shows a bottom portion of hand scanner 314, hand scanner 314 includes line sensor 316 formed from a CCD sensor similar to that of the second or third conventional image reading apparatus described above, optical mouse mechanism 319, and light source 321 for optical mouse mechanism 319.

Referring to FIG. 9(C) which illustrates a manner in which hand scanner 314 scans a predetermined page of book 310 through transparent sheet 318, book 310 shown includes page 311 on which text 312 of an object for reading is printed.

Transparent sheet 318 has a set of equally spaced horizontal lines, for example, of red and a set of equally spaced vertical lines, for example, of green. When hand scanner 314 crosses green and red lines, a sensor in mouse mechanism 319 senses them. The numbers of lines crossed during reading scanning are added then to measure the position of image-reading apparatus 314 with respect to transparent sheet 318. Light source 321 at the bottom portion of hand scanner 314 alternately emits red light and green light to allow mouse mechanism 19 to detect red and green lines separately from each other.

In operation, referring to FIGS. 9(A), 9(B) and 9(C), line sensor 316 senses text 312 on page 311, generates an electric signal in response to text 312 and sends out the electric signal to OCRU 322. Further, OCRU 322 receives from optical mouse mechanism 319 a signal representative of the position of hand scanner 314. OCRU 322 executes one of a large number of optical character recognition algorithms to identify characters being scanned. When OCRU 322 receives a signal representative of presence of a print at a particular point on page 311 as well as information representative of the position of the point, it makes up a bit map in storage section 322 making use of the information.

Since hand scanner 314 is an apparatus of a small size, it may possibly scan information of page 311 in a direction inclined by an angle with respect to text 312. In this instance, comparing with the case wherein hand scanner 314 is held at a correct angle at which line sensor 316 is aligned in a vertical direction with text 312, the position of the particular information of text 312 provided to an end portion of line sensor 316 is sensed in an offset condition corresponding to the inclined angle. As a result, an inaccurate bit map is stored into storage section 322 by computer 324.

In the fourth conventional image reading apparatus, hand scanner 314 may be replaced by hand scanner 314A for detecting the inclination of the hand scanner whose bottom portion is shown in FIG. 9(D). Referring to FIG. 9(D), hand scanner 314A includes, in addition to line sensor 316, optical mouse mechanism 319 and light source 321, second mouse mechanism 320 and second light source 322, and provides information representative of the inclination of hand scanner 314A to computer 324.

Mouse mechanism 319 and mouse mechanism 320 provide each, each time they cross a position identification line of transparent sheet 318, an electric pulse representative of the movement. In this manner, computer 324 traces the positions of mouse mechanisms 319 and 320 and as a result traces the holding angle of hand scanner 314A, line sensor 316 provides a signal from photoelectric transducer element representative of received light and computer 324 calculates further accurately to which position of the bit map the signal corresponds.

The conventional image reading apparatus described above are disadvantageous in that, since the resolution in reading of the original in the subscanning direction is fixed even if the speed of relative movement to the original in the subscanning direction varies, if the speed of movement is raised higher than a certain limit value, reading of the original is disabled. Further, they are disadvantageous also in that, even if the speed of movement is reduced, the picture quality in reading is not improved.

The conventional image reading apparatus are further disadvantageous in that the direction of movement in the subscanning direction is one direction and reading in the opposite direction is impossible.

Furthermore, detection means for detecting the speed of movement using a conventional stripe pattern is disadvantageous in that it is great in size and complicated and it is difficult to apply it to an image reading apparatus of a small size such as a hand scanner.

Further, the transparent sheet which is employed in the third or fourth conventional image reading apparatus of the hand scanner type and on which position information is stored employs, as the position information, a bar code or very accurate graduations, and is disadvantageous in that the accuracy in detection is low or, if it is tried to assure a high degree of detection, an expensive transparent sheet is required.

SUMMARY OF THE INVENTION

It is an object of the present invention to provide an inexpensive image reading apparatus which can suitably maintain, eliminating the disadvantages of the conventional image reading apparatus described above, a resolution in the subscanning direction by adjusting the speed of movement of a scanning section in a subscanning direction in accordance with the degree of fineness/roughness of an original and can reverse the direction of subscanning movement.

In order to attain the object described above, according to a first aspect of the present invention, there is provided an image reading apparatus, comprising a scanning section including an electro-optical conversion apparatus for electro-optically scanning, by means of a plurality of photoelectric transducer elements disposed in a linear array, an original in predetermined main scanning periods in a direction of a main scanning line along the direction of the linear array to convert an image of the original into image data signals and for moving in a subscanning direction perpendicular to the main scanning direction relative to the original, a table sheet for being placed in an overlapping relationship on the original and having a transparent original area to allow the original to be observed therethrough and a pattern area including a stripe pattern disposed in parallel to the subscanning direction along a side of the original area and formed from black and white stripes having a predetermined inclination with respect to the main scanning direction and predetermined widths, pattern signal production means for electro-optically scanning the stripe pattern in the main scanning direction to produce a pattern signal of a predetermined resolution corresponding to the stripe pattern, movement detection means for detecting, in response to the pattern signal supplied thereto, that the stripe pattern moves in the main scanning direction by a distance corresponding to relative movement of the scanning section relative to the original by a predetermined distance in the subscanning direction to produce a movement detection signal, storage control means for storing the image data signals into a buffer memory for each of the main scanning periods, and corrected data production means for producing, in response to the movement detection signal outputted from the movement detection means, corrected data corresponding to the distance of the relative movement of the scanning section in the subscanning direction from the image data signals stored in the buffer memory.

According to a second aspect of the present invention, there is provided an image reading apparatus, comprising a scanning section including an electro-optical conversion apparatus for electro-optically scanning, by means of a plurality of photoelectric transducer elements disposed in a linear array, an original in predetermined main scanning periods in a direction of a main scanning line along the direction of the linear array to convert an image of the original into image data signals and for moving in a subscanning direction perpendicular to the main scanning direction relative to the original, a table sheet for being placed in an overlapping relationship on the original and having a transparent original area to allow the original to be observed therethrough and a pattern area including a stripe pattern disposed in parallel to the subscanning direction along a side of the original area and formed from black and white stripes having a predetermined inclination with respect to the main scanning direction and predetermined widths, pattern signal production means for electro-optically scanning the stripe pattern in the main scanning direction to produce a pattern signal of a predetermined resolution corresponding to the stripe pattern, movement detection means for detecting, in response to the pattern signal supplied thereto, that the stripe pattern moves in the main scanning direction by a distance corresponding to relative movement of the scanning section relative to the original by a predetermined distance in the subscanning direction to produce a movement detection signal and for generating, as subscanning data, the number of those main scanning lines of the image data included in the range of the relative movement of the scanning section by the predetermined distance in the subscanning direction, and a buffer memory for storing the image data signals and the subscanning data for each of the main scanning periods.

According to a third aspect of the present invention, there is provided an image reading apparatus, comprising a scanning section including an electro-optical conversion apparatus for electro-optically scanning, by means of a plurality of photoelectric transducer elements disposed in a linear array, an original in predetermined main scanning periods in a direction of a main scanning line along the direction of the linear array to convert an image of the original into image data signals and for moving in a subscanning direction perpendicular to the main scanning direction relative to the original, a table sheet for being placed in an overlapping relationship on the original and having a transparent original area to allow the original to be observed therethrough and a pattern area including a first stripe pattern disposed in parallel to the subscanning direction at least on one side of the original area and formed from black and white stripes having a predetermined inclination with respect to the main scanning direction and predetermined widths and at least two second stripe patterns formed from black and white stripe patterns of predetermined widths and extending in parallel to the subscanning direction, pattern signal production means for electro-optically scanning the first and second stripe patterns in the main scanning direction to produce a pattern signal of a predetermined resolution corresponding to the first and second stripe patterns, first movement detection means for detecting, in response to the pattern signal supplied thereto, that the first stripe pattern moves in the main scanning direction by a distance corresponding to relative movement of the scanning section relative to the original by a predetermined distance in the subscanning direction to produce a first movement detection signal, second movement detection means for detecting, in response to the pattern signal supplied thereto, movement of the second stripe patterns in a direction opposite to the main scanning direction when the direction of the movement of the scanning section is deflected from the subscanning direction to produce relative movement with respect to the original by a distance greater than a predetermined distance in the main scanning direction to produce a second movement detection signal, inclination detection means for measuring, in response to the pattern signal supplied thereto, the distance between two adjacent ones of the plurality of second stripe patterns to detect an inclination of the linear array with respect to the main scanning direction to produce an inclination signal, storage control means for storing the image data signals into a buffer memory for each of the main scanning periods, and corrected image data production means for producing, in response to the first and second movement detection signals, corrected image data corresponding to the distances of relative movement in the subscanning direction and the main scanning direction from the image data signals stored in the buffer memory.

According to a fourth aspect of the present invention, there is provided an image reading apparatus, comprising a scanning section including an electro-optical conversion apparatus for electro-optically scanning, by means of a plurality of photoelectric transducer elements disposed in a linear array, an original in predetermined main scanning periods in a direction of a main scanning line along the direction of the linear array to convert an image of the original into image data signals and for moving in a subscanning direction perpendicular to the main scanning direction relative to the original, a table sheet for being placed in an overlapping relationship on the original and having a transparent original area to allow the original to be observed therethrough and a pattern area including at least one first stripe pattern formed from black and white stripes disposed in the original area and having a predetermined inclination with respect to the main scanning direction and predetermined widths and at least two second stripe patterns formed from black and white stripe patterns of predetermined widths and extending in parallel to the subscanning direction, pattern signal production means for electro-optically scanning the first and second stripe patterns in the main scanning direction to produce a pattern signal of a predetermined resolution corresponding to the first and second stripe patterns, first movement detection means for detecting, in response to the pattern signal supplied thereto, that the first stripe pattern moves in the main scanning direction by a distance corresponding to relative movement of the scanning section relative to the original by a predetermined distance in the subscanning direction to produce a first movement detection signal, second movement detection means for detecting, in response to the pattern signal supplied thereto, movement of the second stripe patterns in a direction opposite to the main scanning direction when the direction of the movement of the scanning section is deflected from the subscanning direction to produce relative movement with respect to the original by a distance greater than a predetermined distance in the main scanning direction to produce a second movement detection signal, inclination detection means for measuring, in response to the pattern signal supplied thereto, the distance between two adjacent ones of the plurality of second stripe patterns to detect an inclination of the linear array with respect to the main scanning direction to produce an inclination signal, storage control means for storing the image data signals into a buffer memory for each of the main scanning periods, and corrected image data production means for producing, in response to the first and second movement detection signals, corrected image data corresponding to the distances of relative movement in the subscanning direction and the main scanning direction from the image data signals stored in the buffer memory.

According to a fifth aspect of the present invention, there is provided an image reading apparatus, comprising a scanning section including an electro-optical conversion apparatus for electro-optically scanning, by means of a plurality of photoelectric transducer elements disposed in a linear array, an original in predetermined main scanning periods in a direction of a main scanning line along the direction of the linear array to convert an image of the original into image data signals and for moving in a subscanning direction perpendicular to the main scanning direction relative to the original, a table sheet for being placed in an overlapping relationship on the original and having a transparent original area to allow the original to be observed therethrough and a pattern area including at least two first stripe patterns formed from black and white stripes disposed in the original area and having a predetermined inclination with respect to the main scanning direction and predetermined widths and at least one second stripe pattern formed from black and white stripe patterns of predetermined widths and extending in parallel to the subscanning direction, pattern signal production means for electro-optically scanning the first and second stripe patterns in the main scanning direction to produce a pattern signal of a predetermined resolution corresponding to the first and second stripe patterns, first movement detection means for detecting, in response to the pattern signal supplied thereto, that the first stripe patterns move in the main scanning direction by a distance corresponding to relative movement of the scanning section relative to the original by a predetermined distance in the subscanning direction to produce a first movement detection signal, second movement detection means for detecting, in response to the pattern signal supplied thereto, movement of the second stripe patterns in a direction opposite to the main scanning direction when the direction of the movement of the scanning section is deflected from the subscanning direction to produce relative movement with respect to the original by a distance greater than a predetermined distance in the main scanning direction to produce a second movement detection signal, inclination detection means for measuring, in response to the pattern signal supplied thereto, the distance between of the first stripe patterns to detect an inclination of the linear array with respect to the main scanning direction to produce an inclination signal, storage control means for storing the image data signals into a buffer memory for each of the main scanning periods, and corrected image data production means for producing, in response to the first and second movement detection signals, corrected image data corresponding to the distances of relative movement in the subscanning direction and the main scanning direction from the image data signals stored in the buffer memory.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9(A) is a block diagram showing the construction of a fourth conventional image reading apparatus;

FIG. 9(B) is a schematic view showing a hand scanner of the image reading apparatus of FIG. 9(A);

FIG. 9(C) is a perspective view illustrating a condition wherein the hand scanner of FIG. 9(B) scans a page of a text covered with a light transmission sheet;

FIG. 9(D) is a bottom plan view of a hand scanner of a modified form;

DETAILED DESCRIPTION OF THE PREFERRED EMBODIMENTS

Embodiments of the present invention are described below with reference to the drawings.

Figure 10A:
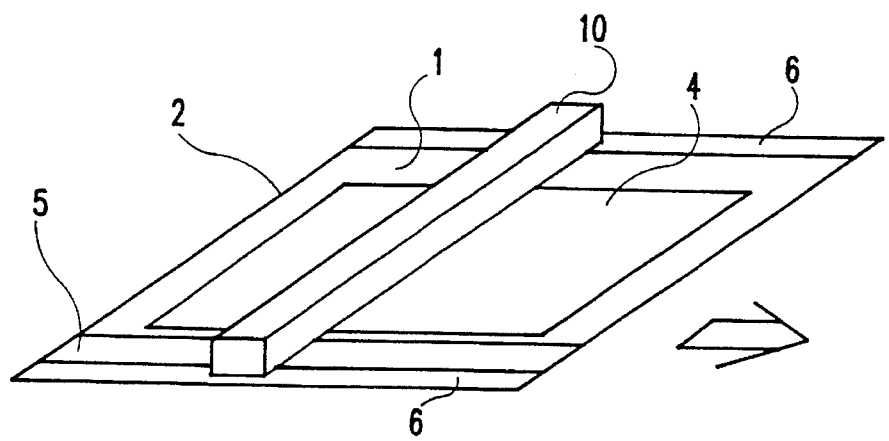
FIG. 10(A) is an appearance view showing a first embodiment of an image reading apparatus of the present invention.

Referring to FIG. 10(A) which shows an appearance of a first embodiment of an image reading apparatus of the present invention, the image reading apparatus shown includes table sheet 1 placed in an overlapping relationship on original 4 to be read, and scanner 10 of the hand type for scanning table sheet 1.

Table sheet 1 has transparent document area 2 formed from a transparent plastic film of 50 to 75 μm thick, pattern area 5 having an oblique stripe pattern, and a pair of black invalid areas 6 at the opposite end portions.

Figure 10B:
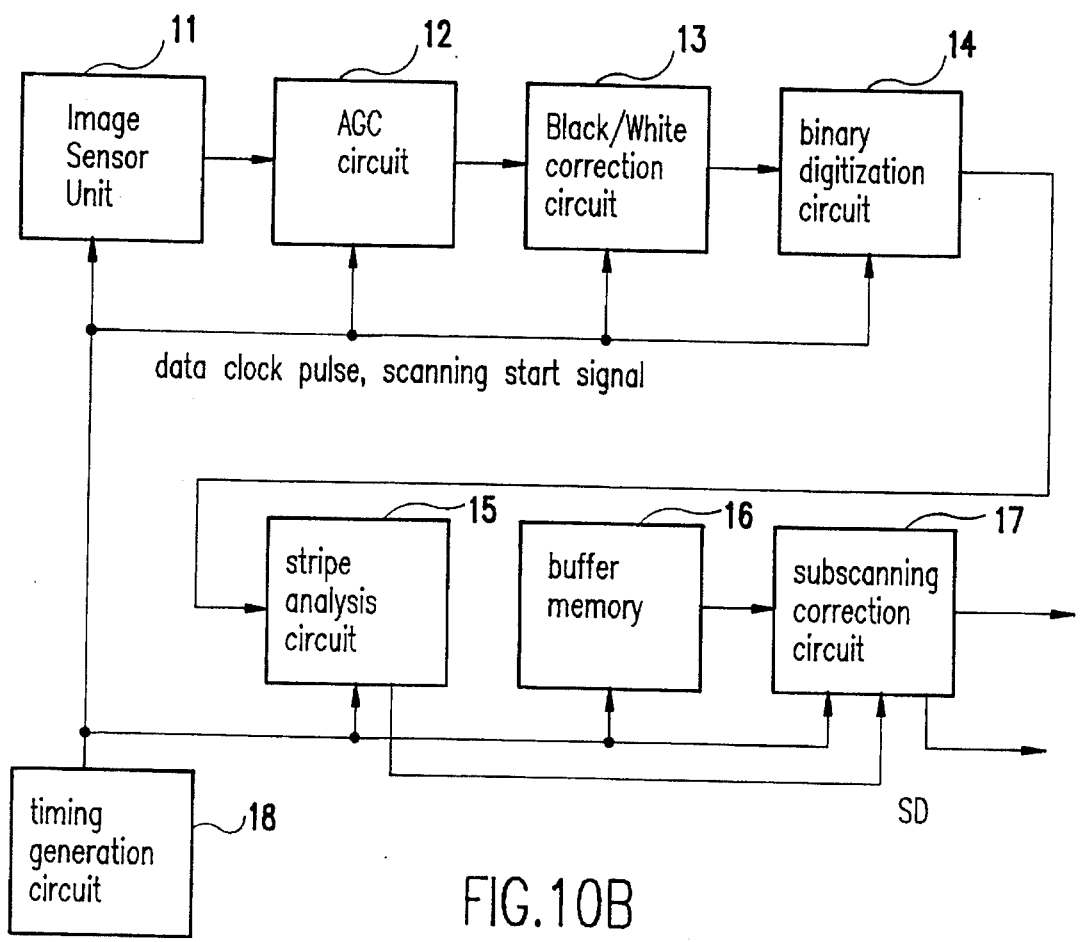
FIG. 10(B) is a block diagram showing the construction of a scanner in FIG. 10(A)

Referring now to FIG. 10(B), scanner 10 includes image sensor unit 11 including an LED light source for irradiating light upon original 4 and pattern area 5, a CCD unit of a linear array type including 1,728 photoelectric transducer elements (hereinafter referred to as elements) arranged linearly and a lens system, AGC circuit 12 for controlling the gain in response to the magnitude of an output signal of each of the elements of image sensor unit 11, black/white correction circuit 13 for reading a black reference and a white reference in advance, calculating correction values for the individual elements, correcting illuminance dispersions by the LED light source and sensitivity dispersions of the elements and converting output signals of AGC circuit 12 by analog to digital conversion, binary digitization circuit 14 formed from a comparator circuit for converting digital image data from black/white correction circuit 13 into binary image data and outputting the binary image data, stripe analysis circuit 15 for calculating the amount of movement of scanner 10 in the subscanning direction from an amount of movement in the main scanning direction based on the binary image data corresponding to pattern area 5 and outputting a corresponding detection signal, buffer memory 16 for temporarily storing the binary image data corresponding to document area 2, subscanning correction circuit 17 for converting, in response to a result of calculation of stripe analysis circuit 15, the image sensor signal into read data by close contacting type scanning in which the number of scanning lines per unit length in the subscanning direction is fixed, and timing generation circuit 18.

Figure 11:
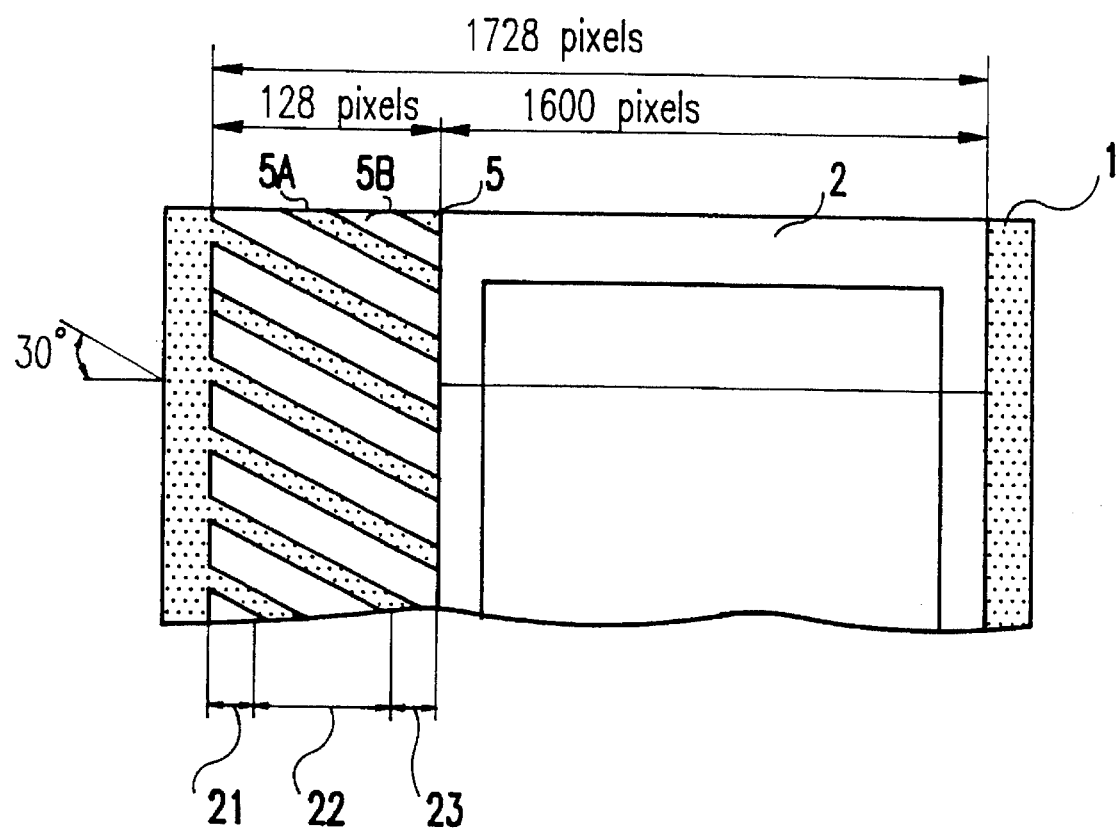
FIG. 11 is a partial plan view showing details of a table sheet of FIG. 10.

Referring to FIG. 11 which is a perspective view of table sheet 1 as viewed from the upper surface to the lower surface of the same, the pattern of pattern area 5 is a stripe pattern consisting of black stripes 5A and white stripes 5B inclined by about 30 degrees with respect to the main scanning direction, that is, the direction of the CCD array of image sensor unit 11 of scanner 10. Those 128 elements from the left end of the 1,728 elements of the CCD array are allocated to optical detection corresponding to pattern area 5. The remaining 1,600 elements of the CCD elements are allocated to reading of original 4 through document area 2.

Pattern area 5 has left side dummy area 21, detection area 22 and right side dummy area 23, and the 0th to 31st elements and the 96th to 127th elements of the 128 elements described above are allocated to left and right side dummy areas 21 and 23, respectively, while the 32nd to 95th elements are allocated to detection area 22.

Operation of the present embodiment is described below with reference to FIGS. 10 and 11. First, reflected light of the image of original 4 having passed through table sheet 1 and reflected light from the stripe pattern in pattern area 5 inclined by about 30 degrees are received by image sensor unit 11 and projected onto the 1,727 elements by way of the lens system. In response to a data clock pulse signal and a scanning start signal from timing generation circuit 18, image sensor unit 11 executes sequential data reading operations beginning with the 0th element and ending with the 1,727th element and supplies analog read data signals to AGC circuit 12. The read data signals amplified by AGC circuit 12 are sequentially corrected in terms of illuminance dispersions of the LED light source and sensitivity dispersions of the elements, converted by analog to digital conversion by black/white correction circuit 13, and then supplied to binary digitization circuit 14. Binary digitization circuit 14 compares the digital signals supplied thereto with a preset threshold level to produce, at an output thereof, binary data consisting of a black signal "1" corresponding to a digital signal equal to or higher than the threshold level and a white signal "0" corresponding to another signal lower than the threshold level. Consequently, the 1,728 digital data signals are sequentially converted into binary data.

Those of the binary data for the 1,600 picture elements in document area 2 are stored into buffer memory 16. Meanwhile, those of the binary data for the 128 picture elements in pattern area 5 are supplied to stripe analysis circuit 15, and stripe analysis circuit 15 analyzes the data for the 128 picture elements to generate subscanning timing pulse SD and supplies subscanning timing pulse SD to subscanning correction circuit 17. Subscanning correction circuit 17 reads out, each time subscanning timing pulse SD is supplied thereto, binary data of buffer memory 16 which have been stored within the period from the last subscanning timing pulse to the current subscanning timing pulse, and averages, when the binary data correspond to a plurality of image scanning lines (hereinafter referred to as scanning lines), the binary data for the plurality of scanning lines for each picture element. On the other hand, when subscanning timing pulse SD is generated by a plural number within the period for one scanning line of binary data of buffer memory 16, data corresponding to subscanning timing pulses SD are estimated from binary data of scanning lines in the proximity of the one scanning line. Consequently, corrected binary data are outputted from subscanning correction circuit 17 for each subscanning timing pulse SD.

Referring to FIGS. 12 to 15, details of the stripe pattern and operation timings of stripe analysis circuit 15 are described.

Here, it is assumed that the resolution of the image reading apparatus in the present embodiment is 8 picture elements/mm in the main scanning direction and 8 scanning lines/mm in the subscanning direction similarly as in the second conventional image reading apparatus described hereinabove. Meanwhile, the field of view of each element of image sensor unit 11 has a size for one picture element, that is, ⅛ mm×⅛ mm.

Figure 12:
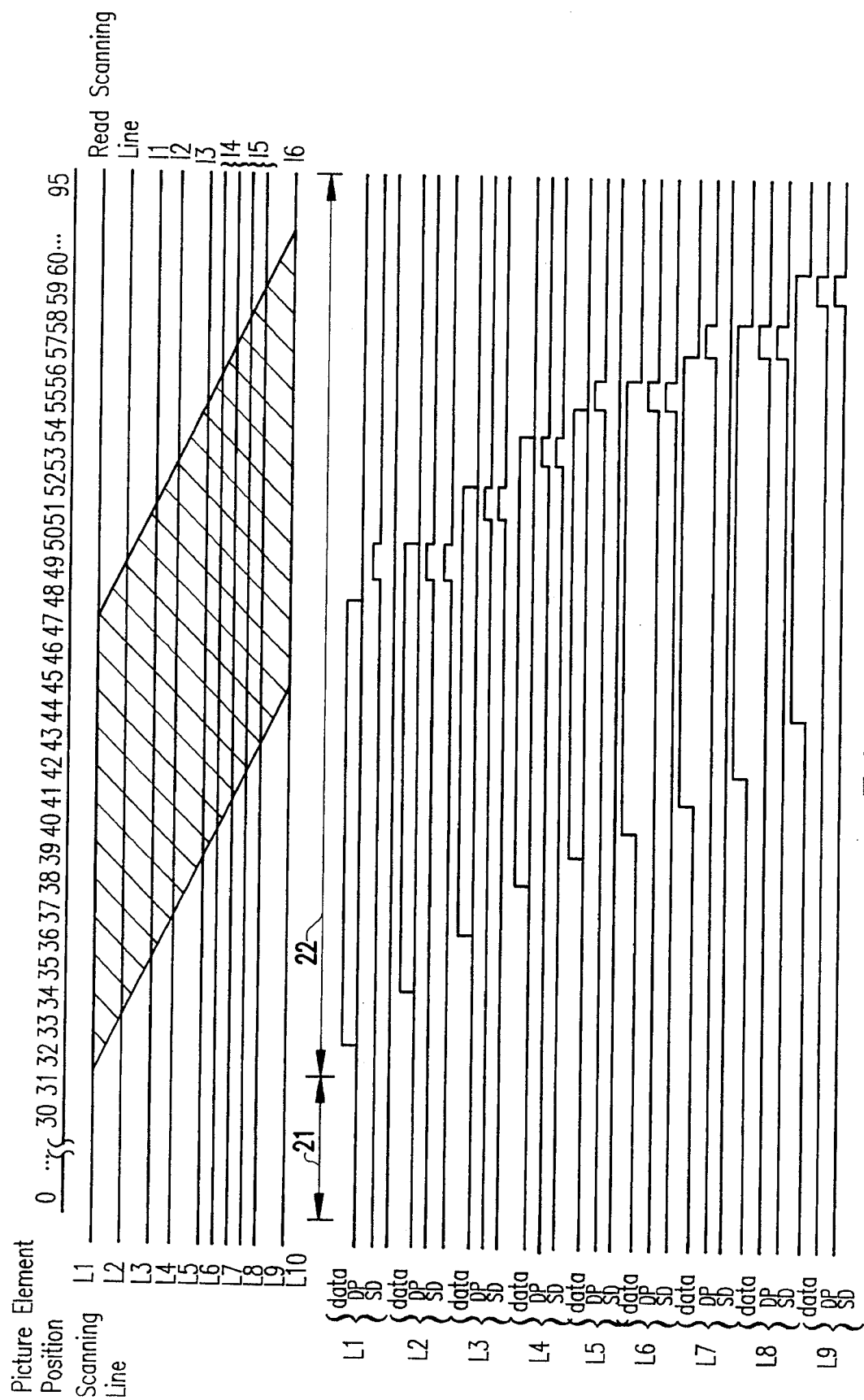
FIG. 12 is a first view illustrating the relationship between a stripe pattern and scanning lines upon relative movement at a variable speed between the scanner and the table sheet and showing a time chart of corresponding signals.
Figure 13:
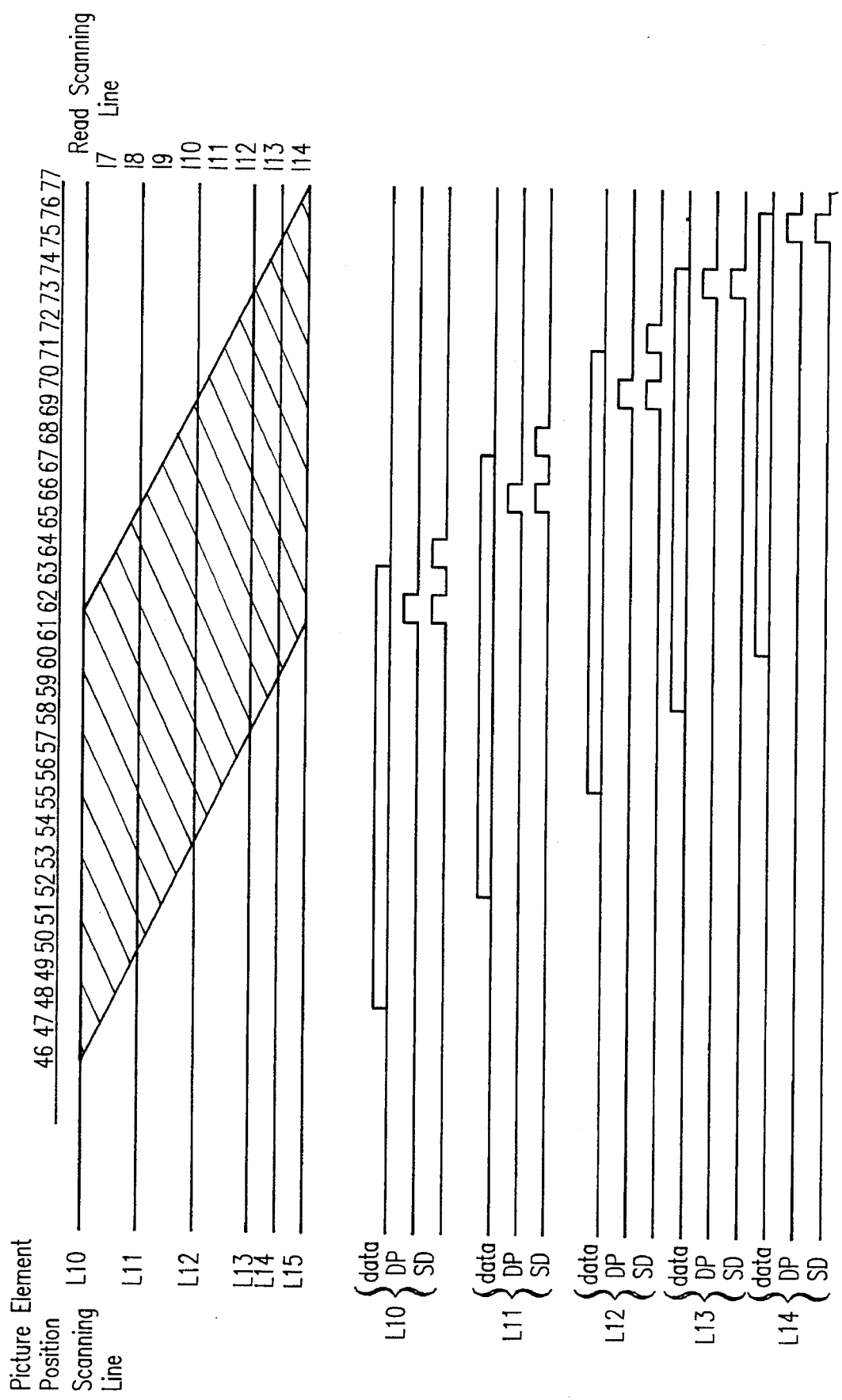
FIG. 13 is a second view illustrating the relationship between a stripe pattern and scanning lines upon relative movement at a variable speed between the scanner and the table sheet and showing a time chart of corresponding signals.
Figure 14:
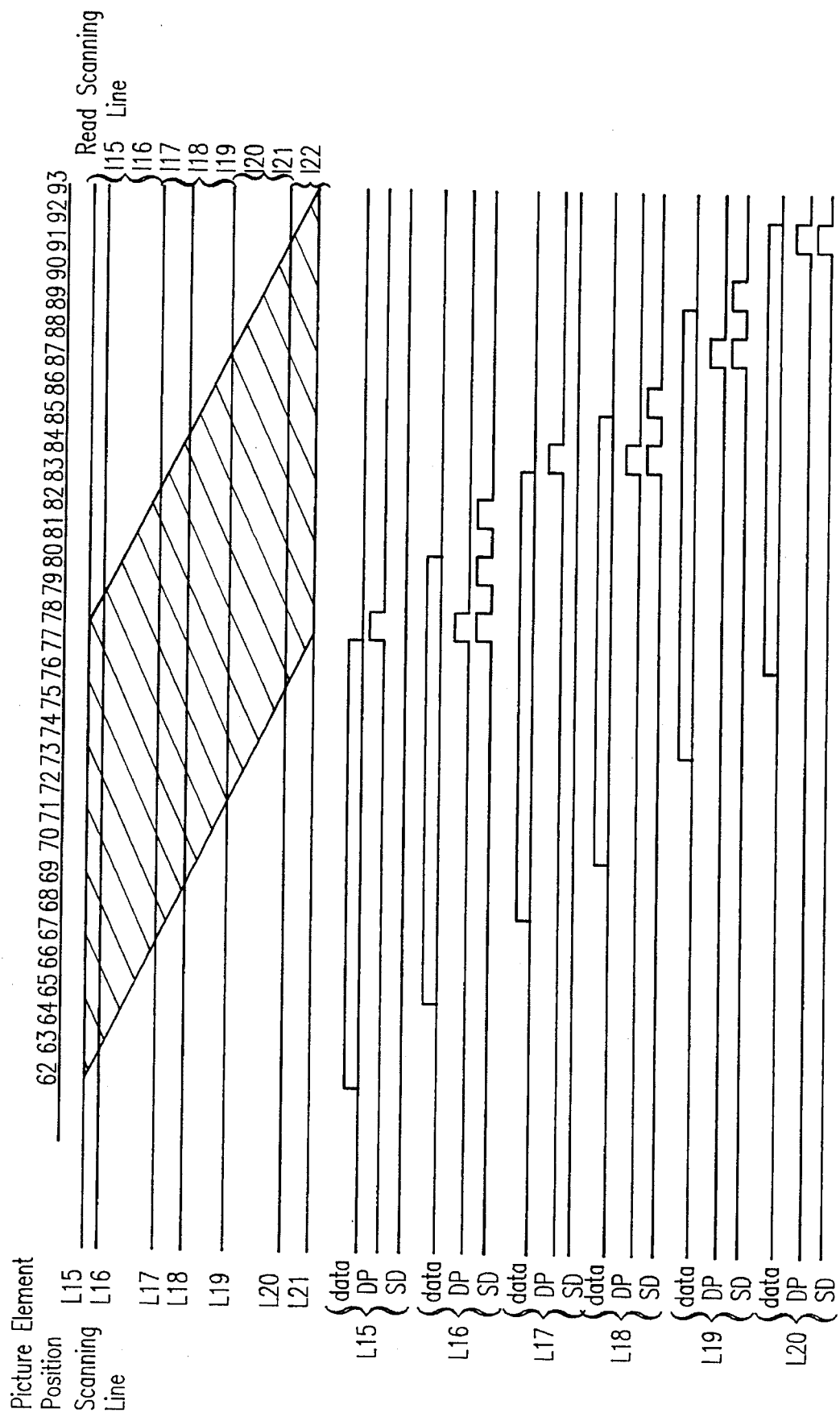
FIG. 14 is a third view illustrating the relationship between a stripe pattern and scanning lines upon relative movement at a variable speed between the scanner and the table sheet and showing a time chart of corresponding signals.
Figure 15:
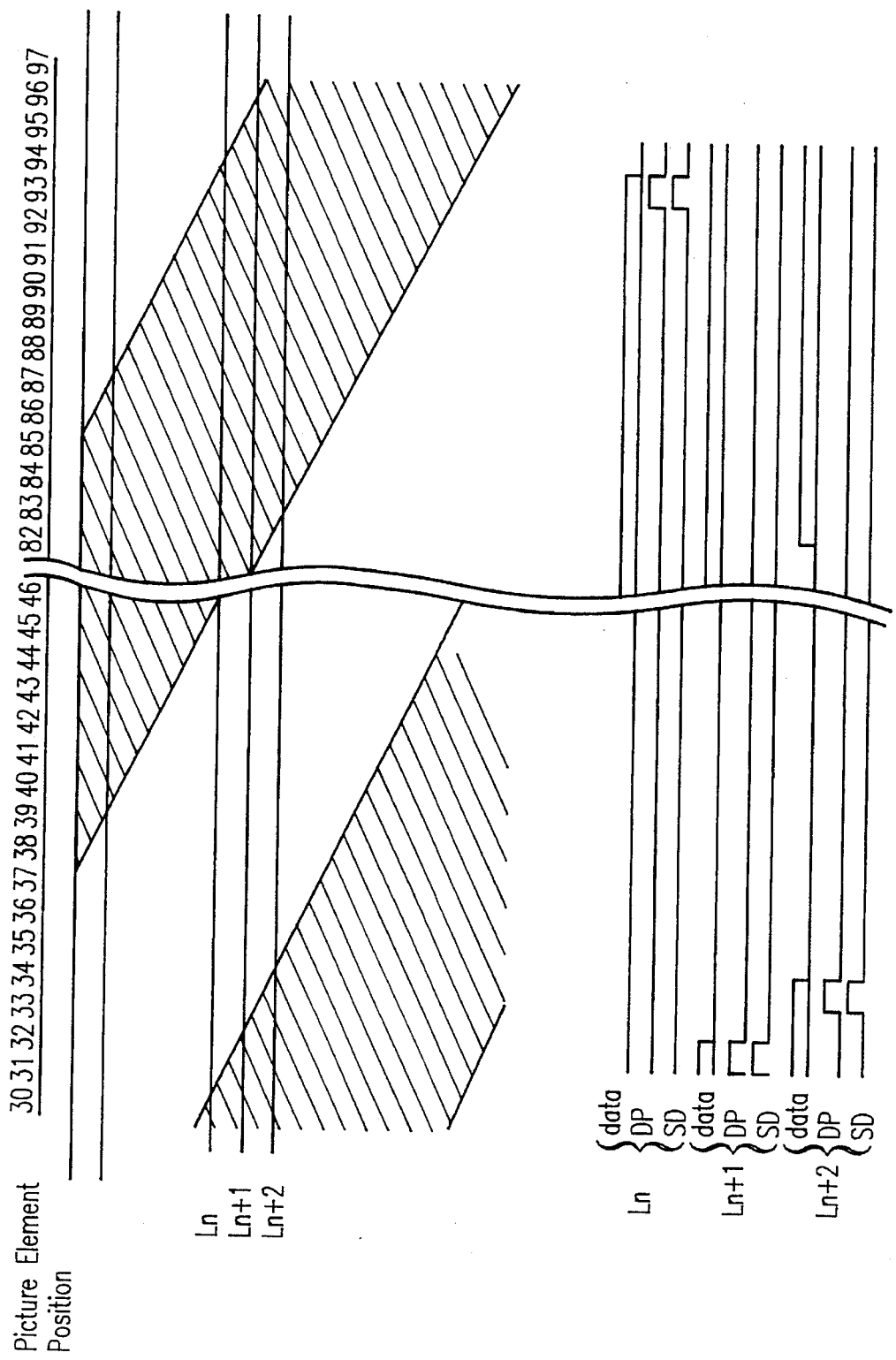
FIG. 15 is a fourth view illustrating the relationship between a stripe pattern and scanning lines upon relative movement at a variable speed between the scanner and the table sheet and showing a time chart of corresponding signals.

FIGS. 12 to 14 illustrate responding states of the elements of image sensor unit 11 by relative movement between scanner 10 and table sheet 1 in the directions of main scanning lines L1 to L21, and the data reading sampling operation which is main scanning is repeated at a fixed sampling speed for each scanning start signal. Here, if the speed of movement of scanner 10 in the subscanning direction perpendicular to the main scanning direction are held at a fixed speed synchronized with the sampling speed, the main scanning is repeated at a fixed distance of ⅛ mm in the subscanning direction as seen from scanning lines L1 to L5. Scanning lines L1 to L21 in FIGS. 12 to 14 indicate the subscanning positions on table sheet 1 upon starting of scanning lines to be read by scanner 10. Namely, as a result of movement in the subscanning direction, scanning of nth scanning line Ln is performed at an intermediate position between nth scanning line Ln and next scanning line Ln+1. Meanwhile, each time subscanning timing pulse SD is generated, that is, each time scanner 10 moves by ⅛ mm in the subscanning direction, corrected binary data of read scanning lines 11 to 122 are outputted. Accordingly, the speed of movement in the subscanning direction between scanning lines L2 and L3, L3 and L4, and L4 and L5 are in synchronism with the reading sampling speed and the amounts of movement are all ⅛ mm, and scanning of scanning lines L2, L3 and L4 is executed between the lines and read scanning lines 11, 12 and 13 are outputted. Further, if the speed of movement of scanner 10 in the subscanning direction becomes lower than the reading sampling speed, the amount of movement in the subscanning direction becomes smaller than ⅛ mm as seen from scanning lines L5 to L9. Since the amounts of movement in the subscanning direction between scanning lines L5 and L7, and L7 and L9 are both ⅛ mm, scanning of scanning lines L5 and L6 is executed at the position between scanning lines L5 and L7, and read scanning line 14 which has an average value between the two lines for each one picture element is outputted. Further, at the position between scanning lines L7 and L9, scanning of scanning lines L7 and L8 is executed, and read scanning line 15 which has an average value between the two lines for each one picture element is outputted.

On the contrary, if the speed of movement of scanner 10 becomes higher than the sampling speed, the main scanning is repeated at a distance greater than ⅛ mm as seen from scanning lines L10 to L13. Here, the distances between scanning lines L10 and L11, L11 and L12, and L12 and L13 are all ⅔ mm. Accordingly, read scanning lines 17 and 18 are outputted corresponding to scanning line L10; read scanning lines 19 and 110 are outputted corresponding to scanning line L11; and read scanning lines 111 and 112 are outputted corresponding to scanning line L12.

In order to allow detection of the distance of movement for each ⅛ mm which is the nominal scanning line distance, the stripe pattern of pattern area 5 is inclined by about 30 degrees with respect to the main scanning direction as described hereinabove, and detection position DP is set by stripe analysis circuit 15. Stripe analysis circuit 15 discriminates whether or not the distance between scanning lines reaches ⅛ mm in response to relative movement of scanner 10, and generates subscanning timing pulse SD. Detection position DP is a detection window corresponding to the size of one picture element, that is, ⅛ mm. The initial position of detection position DP can be set to an arbitrary picture element position within detection area 22. For the convenience of description, this detection position DP is set to picture element position 50 here.

Figure 16:
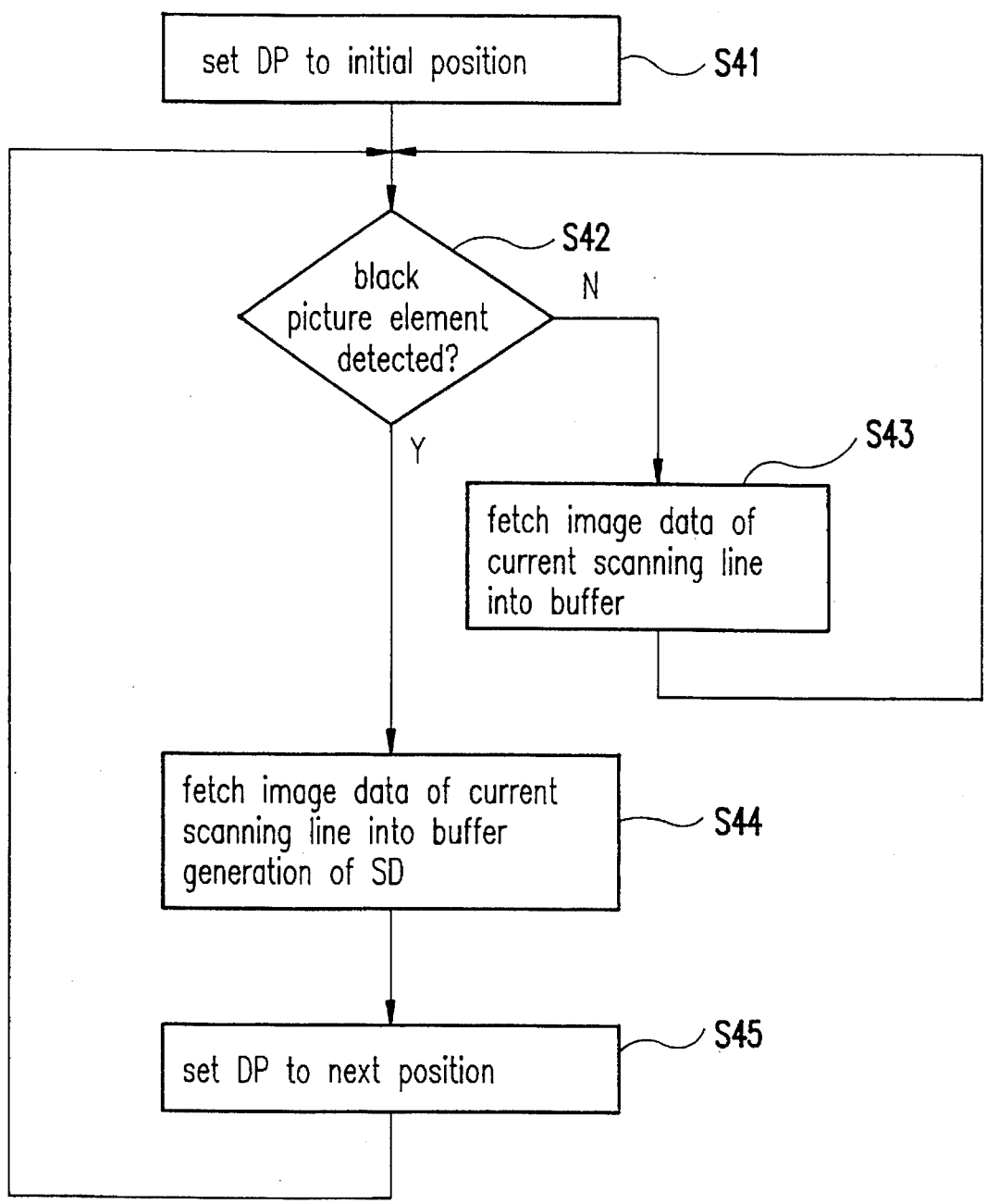
FIG. 16 a flow chart illustrating operation of the image reading apparatus of the present embodiment.

Referring also to FIG. 16 which is a flow chart of operation of the present image reading apparatus, the initial setting operation is indicated by step S41. Then, it is discriminated whether or not a black stripe, that is, a black picture element, is detected at detection position DP (step S42). Referring to FIG. 12, scanning line L1 has no black picture element at the detection position corresponding to picture element position 50. At step S42, NO is outputted, and at step S43, image data of scanning line L1 are fetched into buffer memory 16. At scanning line L2, a black picture element is detected at detection position DP. This condition is indicated by the output of YES at step S42. At step S44, image data of scanning line L2 are fetched into buffer memory 16 and subscanning timing pulse SD is generated by one, and at step S45, detection position DP is shifted to picture element position 52 spaced by a two picture element distance in the rightward direction. Thereafter, the operation is returned to step S42, at which it is discriminated whether or not a black picture element on scanning line L3 is detected at the new detection position, that is, at picture element position 52. Since the result at step S42 is YES, the operation advances to step S44, at which image data of scanning line L3 are fetched into buffer memory 16 and subscanning timing pulse SD is generated by one, and then at next step S45, detection position DP is shifted to picture element position 54 spaced by a two picture element distance in the rightward direction.

Similarly, steps S42, S44 and S45 are repeated also for scanning line L4 so that fetching of image data into buffer memory 16, generation of subscanning timing pulse SD and shifting of the detection position to picture element position 56 are performed. Since a black picture element is not detected at picture element position 56 of detection position DP in next scanning line L5, the operation proceeds to step 43, at which the image data of scanning line L5 are fetched into buffer memory 16, whereafter the operation returns to step S42. Scanning operations for scanning lines L6, L7, L8 and L9 are performed in a similar manner.

Next, in a scanner operation for scanning line L10, it is discriminated at step S42 whether or not a black element on scanning line L10 is detected at picture element position 62 of detection position SD. The result of discrimination is YES, and a picture element is detected also at picture element position 63 spaced by a one picture element distance in the rightward direction. Accordingly, at next step S44, image data are fetched into buffer memory 16 and two subscanning timing pulses SD are generated. In particular, when N black picture elements are detected on the right side of a picture element corresponding to detection position DP, 1+N subscanning timing pulses SD are generated. Similarly, subscanning timing pulse. SD is generated by two at scanning lines L11, L12, L18 and L19, by one at scanning lines L13, L14 and L20, by zero at scanning lines L15 and L17, and by three at scanning line L16.

Table 1 illustrates the relationship among scanning of scanning lines L1 to L20 of FIGS. 12 to 14, the number of subscanning timing pulses, the read scanning line and correction data for the read scanning line.

TABLE 1

| Scanning line | Sub-scanning timing pulse number | Read scanning line | Corrected data of read scanning line |
| --- | --- | --- | --- |
| L1 | 0 | | |
| L2 | 1 | 11 | DATA(L2) |
| L3 | 1 | 12 | DATA(L3) |
| L4 | 1 | 13 | DATA(L4) |
| L5 | 0 | 14 | (DATA(L5)+DATA(L6))/2 |
| L6 | 1 | | |
| L7 | 0 | 15 | (DATA(L7)+DATA(L8))/2 |
| L8 | 1 | | |
| L9 | 1 | 16 | DATA(L9) |
| L10 | 2 | 17,18 | DATA(L10) |
| L11 | 2 | 19,110 | DATA(L11) |
| L12 | 2 | 111,112 | DATA(L12) |
| L13 | 1 | 113 | DATA(L13) |
| L14 | 1 | 114 | DATA(L14) |
| L15 | 0 | 115 | (DATA(L15)+DATA(L16))/2 |
| L16 | 3 | 116,117 | DATA(L16) |
| L17 | 0 | 118 | (DATA(L17)+DATA(L18))/2 |
| L18 | 2 | 119 | DATA(L18) |
| L19 | 2 | 120,121 | DATA(L19) |
| L20 | 1 | 122 | DATA(L20) |

Each time subscanning timing pulse SD is generated, corrected binary data of read scanning lines 11 to 122 are outputted. When the amount of movement in the subscanning direction after the start of scanning till the start of next scanning is small as in scanning of scanning lines L5 and L6, subscanning timing pulse SD is not outputted upon scanning of scanning line L5, but one subscanning timing pulse SD is outputted upon scanning of scanning line L6. In particular, the amount of movement in the subscanning direction in scanning of scanning lines L5 and L6 is ⅛ mm. Accordingly, corrected data of read scanning line 14 is an average of picture signal DATA(L5) by scanning of scanning line L5 and picture signal DATA(L6) by scanning of scanning line L6, that is, (DATA(L5)+DATA(L6))/2.

On the other hand, when the amount of movement in the subscanning direction after the start of scanning till the start of next scanning is large as in scanning of scanning line L10, two subscanning timing pulses SD are outputted upon scanning of scanning line L10. In particular, the amount of movement in the subscanning direction upon scanning of scanning line L10 is 2/8 mm. Accordingly, corrected data of read scanning lines 17 and 18 are equal between them and are picture signal DATA(L10) by scanning of scanning line L10.

In scanning of scanning lines L15 and L16, subscanning timing pulse SD is not outputted upon scanning of scanning line L15, but three subscanning timing pulses SD are outputted upon scanning of scanning line L16. Therefore, corrected data of read scanning line 115 is given by (DATA(L15)+DATA(L16))/2. Corrected data of read scanning lines 116 and 117 are equal between them and are DATA(L16).

Picture signals corresponding to read scanning lines 11 to 122 are shown in Table 2 below. Since a black picture element is first detected at the detection position of scanning line L2, data of the scanning lines beginning with scanning line L3, that is, data of the read scanning lines beginning with read scanning line 12, are listed as effected data.

TABLE 2

| Read scanning line | |
|---|---|
| '11 | DATA(L2) |
| 12 | DATA(L3) |
| 13 | DATA(L4) |
| 14 | {DATA(L5)+DATA(L6)}/2 |
| 15 | {DATA(L7)+DATA(L8)}/2 |
| 16 | DATA(L9) |
| 17 | DATA(L10) |
| 18 | DATA(L10) |
| 19 | DATA(L11) |
| 110 | DATA(L11) |
| 111 | DATA(L12) |
| 112 | DATA(L12) |
| 113 | DATA(l13) |
| 114 | DATA(L14) |
| 115 | {DATA(L15)+DATA(L16)}/2 |
| 116 | DATA(L16) |
| 117 | DATA(L16) |
| 118 | {DATA(L17)+DATA(L18)}/2 |
| 119 | DATA(L18) |
| 120 | DATA(L19) |
| 121 | DATA(L19) |
| 122 | DATA(L20) |

Read picture signals DATA(L1) to DATA(L20) of scanning lines L1 to L20 are written into buffer memory 16, and subscanning correction circuit 17 calculates picture signals of subscanning lines 11 to 122 in response to subscanning timing pulses SD from stripe analysis circuit 15 using Table 2 and outputs corrected binary data together with an enable signal indicative of a picture signal effective section.

In stripe analysis circuit 15, detection position DP is shifted by a two picture element distance in the rightward direction each time one subscanning timing pulse SD is outputted, and when it reaches picture element position 94 at the right end of detection area 22 (the picture element position at the right end is disqualified as a candidate for the detection position since it is odd-numbered), detection position DP is returned to picture element position 32 at the left end of detection area 22. The returning operation is indicated by pulses DP at scanning lines Ln, Ln+1 and Ln+2 in FIG. 15.

Next, image reading operation when scanner 10 is moved in the reverse direction opposite to the forward direction indicated by an arrow in FIG. 10(A) to scan an original is described.

Figure 17:
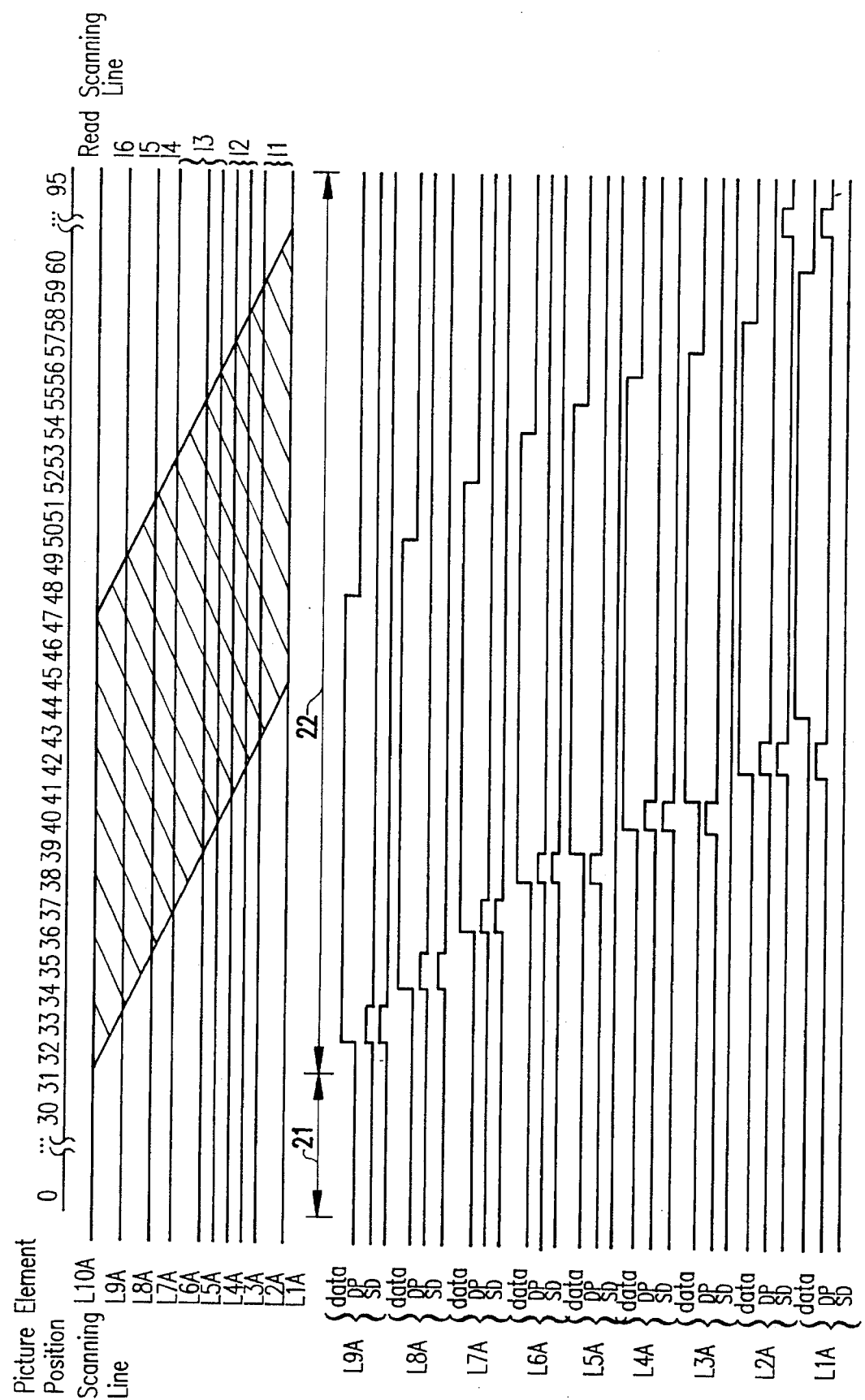
FIG. 17 is a view illustrating the relationship between a stripe pattern and scanning lines upon relative movement in the reverse direction between the scanner and the table sheet and showing a time chart of corresponding signals.

Referring to FIG. 17 which illustrates the movement of the field of view of each element of image sensor unit 11 by relative movement of scanner 10 to table sheet 1 in the reverse direction at scanning lines L1 to L9, detection position DP is set by stripe analysis circuit 15 similarly as in FIG. 12. Stripe analysis circuit 15 discriminates whether or not the distance between adjacent scanning lines reaches 1/8 mm as a result of the relative movement of scanner 10, and generates subscanning timing pulse SD.

Prior to movement of original 4 in the subscanning direction, scanner 10 is stopped and picture elements at positions corresponding to scanning line L1A of original 4 are read by main scanning. Scanning line L1A has black picture elements at picture element positions 45 to 60. Thus, in order to identify whether or not the direction of movement of scanner 10 is the reverse direction, the initial position of detection position DP, that is, the detection window, is set to two positions of picture element positions 43 and 62. Scanner 10 is moved in the reverse direction to start scanning of original 4. On scanning line L2A, a black picture element at detection position DP is detected at picture element position 43. Since the direction of movement of scanner 10 is settled thereby, only one position is thereafter treated as detection position DP, and detection position DP is shifted to picture element position 41 displaced by a two picture element distance in the leftward direction. Thereafter, scanning of original 4 is performed in a similar manner as in scanning in the forward direction, and image data of scanning lines L1A to L9A are fetched into buffer memory 16. However, upon reading out the image data from buffer memory 16, the reading order in each scanning line is reverse to the fetching order.

Figure 18A:
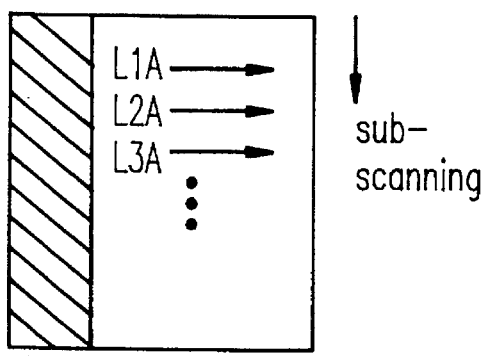
FIGS. 18(A) to 18(F) are diagrammatic views illustrating the relationship of the scanning direction to reading in and reading out of a buffer memory.
Figure 18D:
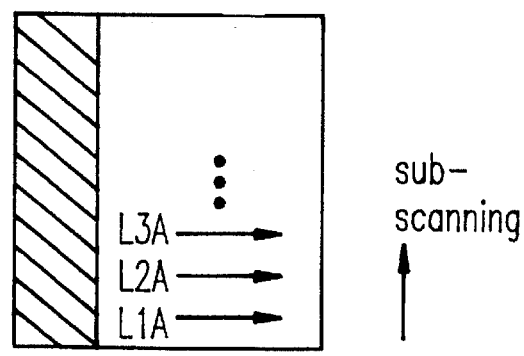
Figure 18B:
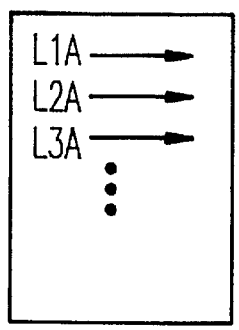
Figure 18E:
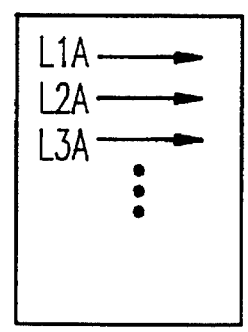
Figure 18C:
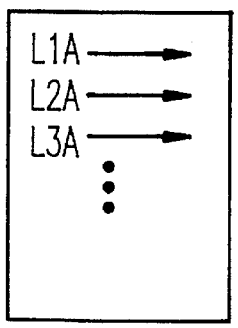
Figure 18F:
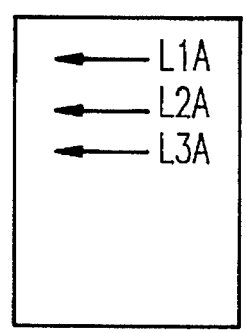

Referring to FIGS. 18(A) to 18(F), FIG. 18(A) illustrates the positional relationship of scanning lines L1, L2 and L3 when scanner 10 is moved in the forward direction to scan the original. Image data of scanning lines L1, L2, L3, ... are fetched into buffer memory 16 in order from the left to the right for each scanning line as seen from FIG. 18(B), and are read out from buffer memory 16 in order from the left to the right similarly as upon fetching as seen from FIG. 18(C). On the other hand, FIG. 18(D) illustrates the positional relationship of scanning lines L1A, L2A and L3A when scanner 10 is moved in the reverse direction to scan original 4. Image data of scanning lines L1A, L2A, L3A, ... are fetched into buffer memory 16 in order from the left to the right for each scanning line as seen from FIG. 18(E), and are read out from buffer memory 16 in order from the right to the left reversely to that upon fetching as seen from FIG. 18(F). As a result, the directions of the scanner in FIGS. 18(D) and 18(F) become same as each other, and correct image data are reproduced.

Figure 19:
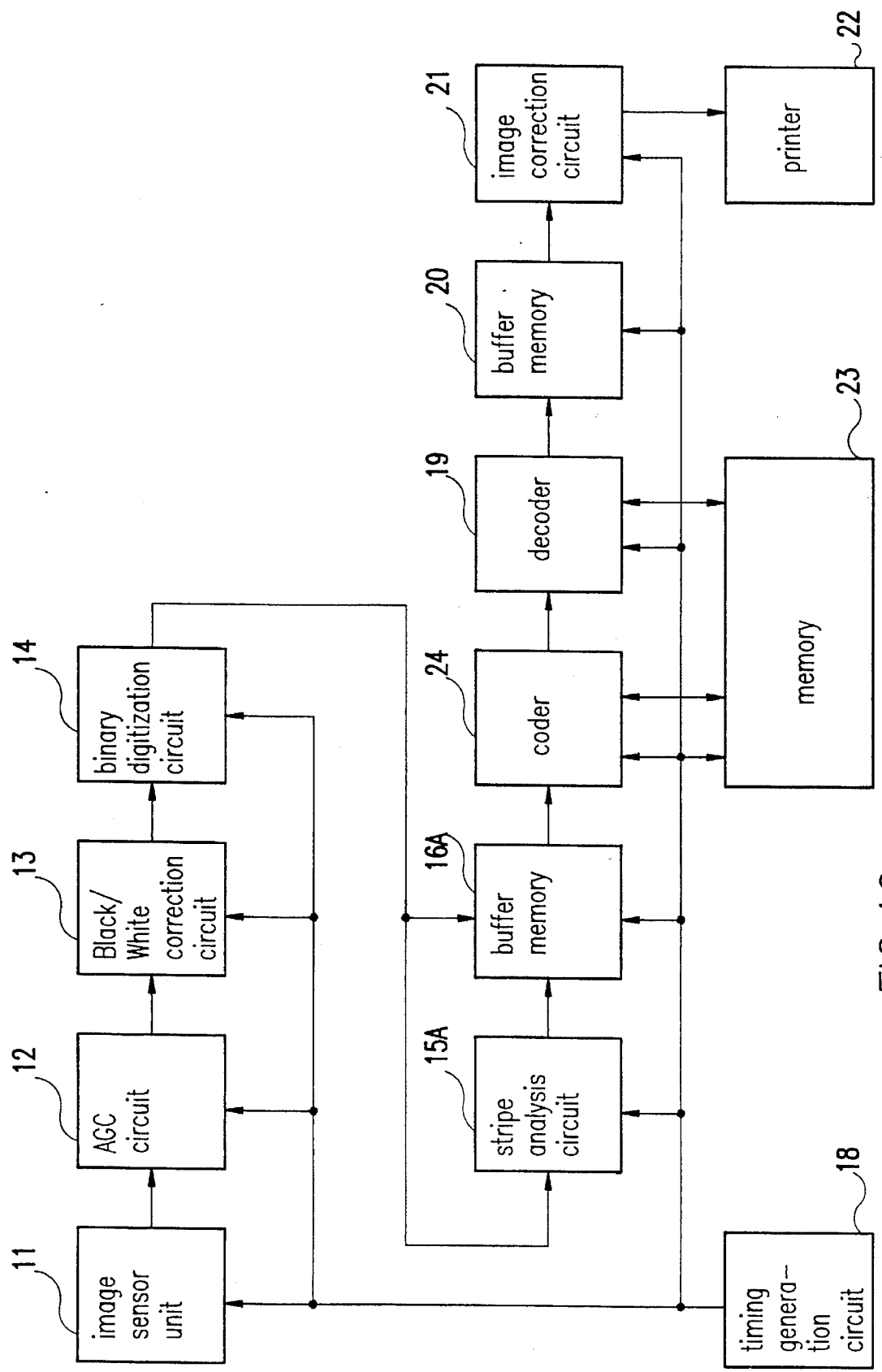
FIG. 19 is a block diagram of a scanner showing a second embodiment of an image reading apparatus of the present invention.

A block diagram of the second embodiment of the present invention is shown in FIG. 19. The present embodiment is different from the first embodiment shown in FIG. 10 in that it includes stripe analysis circuit 15A provided in place of stripe analysis circuit 15 for outputting subscanning data representative of a corresponding relationship between image data from binary digitization circuit 14 and the amount of movement of scanner 10 in the subscanning direction, buffer memory 16A provided in place of buffer memory 16 for storing, in addition to image data, the subscanning data from stripe analysis circuit 15, and coder 24 provided in place of subscanning correction circuit 17 for converting the image data and the subscanning data stored in buffer memory 16A into compressed coded data, memory 23 for storing the coded data, decoder 19 for decoding the coded data stored in memory 23 back into decoded data corresponding to the original image data and subscanning data, buffer memory 20 for storing the decoded data, image reproduction circuit 21 for reproducing the image data of original 4 as reproduction image data from the decoded data read out from buffer memory 20, and printer 22 for recording the reproduction image data.

In operation, the components 11 to 14 of the present embodiment are the same as those of the first embodiment described above and individually operate in similar manners, and accordingly, overlapping description thereof is omitted herein.

Those data of the 1,600 picture elements corresponding to document area 2 from among the binary data from binary digitization circuit 14 are directly stored into buffer memory 16A. Meanwhile, signals of the 128 picture elements corresponding to pattern area 5 are supplied to stripe analysis circuit 15A, and stripe analysis circuit 15A analyzes the 128 picture elements to produce subscanning data representative of a corresponding relationship between the data of the 1,600 picture elements of document area 2 and the amount of movement in the subscanning direction and stores the subscanning data into buffer memory 16A.

Next, the data format of buffer memory 16A is described. For the convenience of description, it is assumed that the relationship between read picture signals DATA(L2) to DATA(L20) of scanning lines L1 to L20 and subscanning lines 11 to 122 is such as shown in Table 2 similarly as in the first embodiment. The first data format of buffer memory 16 in this instance is shown in Table 3. The subscanning data indicative of the relationship between the image data and the amount of movement in the subscanning direction is the number of subscanning timing pulses of Table 1.

TABLE 3

| Image data signal | Sub scanning data |
| --- | --- |
| DATA(L2) | 1 |
| DATA(L3) | 1 |
| DATA(L4) | 1 |
| DATA(L5) | 0 |
| DATA(L6) | 1 |
| DATA(L7) | 0 |
| DATA(L8) | 1 |
| DATA(L9) | 1 |
| DATA(L10) | 2 |
| DATA(L11) | 2 |
| DATA(L12) | 2 |
| DATA(L13) | 1 |
| DATA(L14) | 1 |
| DATA(L15) | 0 |
| DATA(L16) | 3 |
| DATA(L17) | 0 |
| DATA(L18) | 2 |
| DATA(L19) | 2 |
| DATA(L20) | 1 |
| — | — |

The second data format of buffer memory 16A is indicated in Table 4 below. The second data format is different from the first data format where a plurality of lines of data signals correspond to one subscanning line. For example, in an example wherein two lines of data signals DATA(L5) and DATA(L6) correspond to one subscanning line, "1" is placed immediately after data signal {DATA(L5)+DATA(L6)}/2 which is an average of picture signals DATA(L5) and DATA(L6) in scanning lines L5 and L6 with regard to a same picture element in the main scanning direction.

TABLE 4

| Image data signal | Subscanning data |
| --- | --- |
| DATA(L2) | 1 |
| DATA(L3) | 1 |
| DATA(L4) | 1 |
| {DATA(L5)+DATA(L6)}/2 | 1 |
| {DATA(L7)+DATA(L8)}/2 | 1 |
| DATA(L9) | 1 |
| DATA(L10) | 2 |
| DATA(L11) | 2 |
| DATA(L12) | 2 |
| DATA(L13) | 1 |
| DATA(L14) | 1 |
| {DATA(L15)+DATA(L16)}/2 | 1 |
| DATA(L16) | 2 |
| {DATA(L17)+DATA(L18)}/2 | 1 |
| DATA(L18) | 1 |
| DATA(L19) | 2 |
| DATA(L20) | 1 |

Since data signals DATA(L15) and DATA(L16) for two lines correspond to one subscanning line and data signal DATA(1L6) for one line correspond to two subscanning lines, "1" is stored once immediately after data signal {DATA(L15)+DATA(L16)}/2, and "2" is stored in buffer memory 16A once immediately after data signal DATA(L16). Image data stored in buffer memory 16A are compressed by coder 24 into coded image data formed from such a code as, for example, MH or MR which is a compression code form, and are stored into memory 23. While the data signals can be coded as they are, using the code MH or MR, they may be stored while the corresponding relationship between the data signals and the detection signals remains in the form of Table 3 or 4 as it is. The data signals of original 4 by scanner 10 and the corresponding relationship between the data signals and the detection signals are stored in the form of coded image data into memory 23 in such a manner as described above. When reproduction of an image read by scanner 10 becomes necessary, the coded image data stored in memory 23 are read out into and decoded by decoder 19, and they are converted into data of the original data format of Table 3 or Table 4. Thereafter, the data are converted into image data of original 4, that is, into image data of the data format of Table 2, by image reproduction circuit 21, and the image data of original 4 are recorded by printer 22.

Figure 20A:
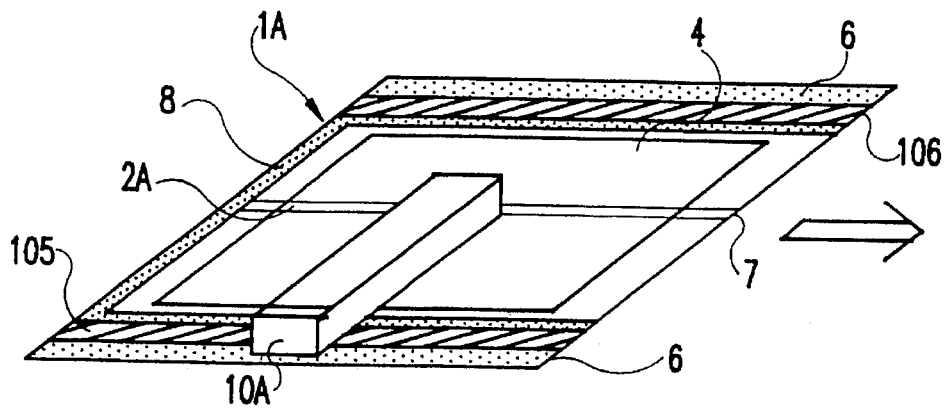
FIGS. 20(A) and 20(B) are an appearance view showing a third embodiment of an image reading apparatus of the present invention and a block diagram of a scanner of the image reading apparatus, respectively.
Figure 20B:
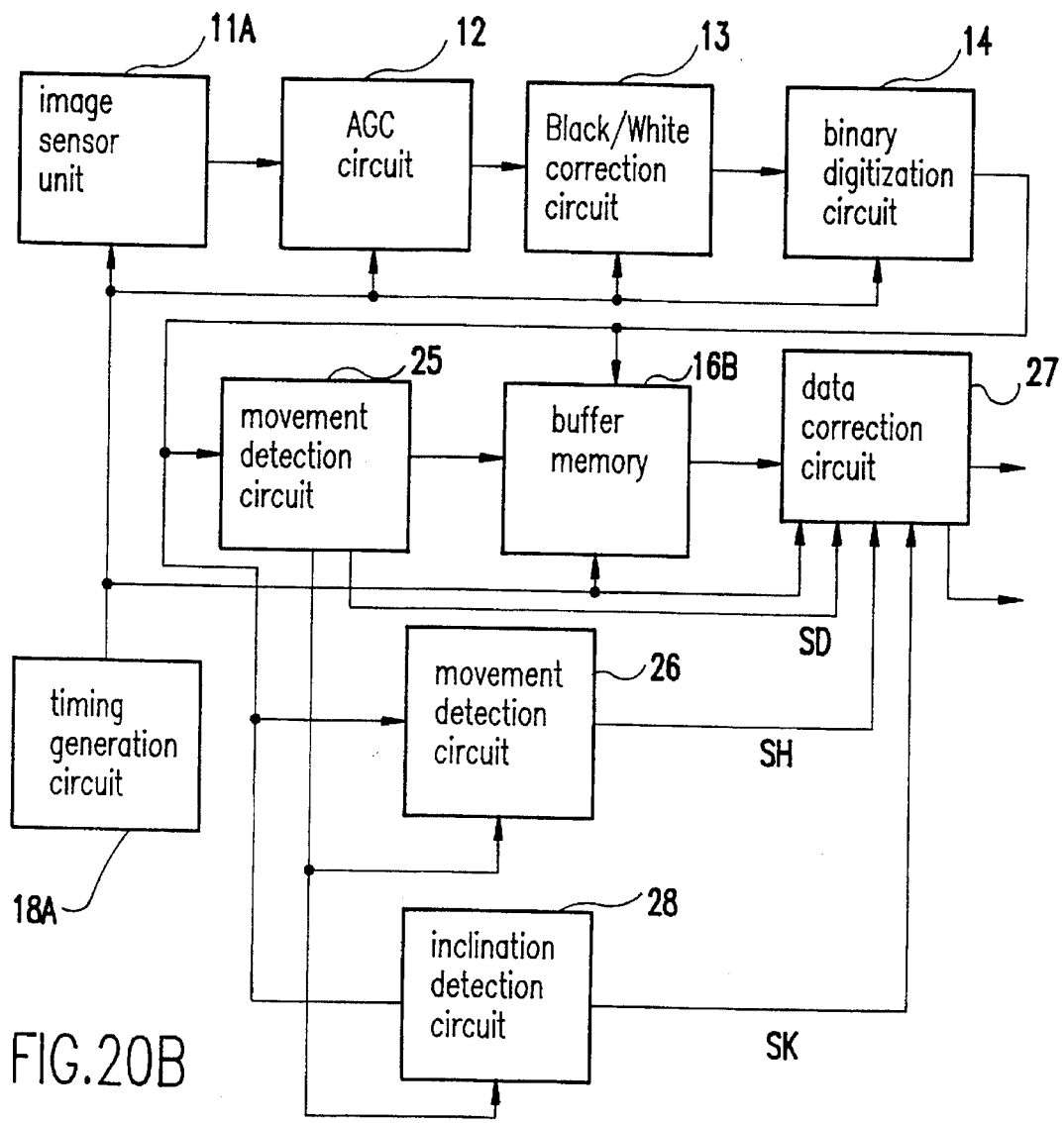

Referring to FIGS. 20(A) and 20(B) which show an appearance and blocks of the construction of the third embodiment of the image reading apparatus of the present invention, respectively, and in which common components to those of FIGS. 10(A) and 10(B) are denoted by common reference numerals, the image reading apparatus in the present embodiment shown is different from the first embodiment described above in that it includes table sheet 1A which is provided in place of table sheet 1 and additionally includes, as hereinafter described, a pair of pattern areas 105 and 106 at the left and right opposite end portions, start line 8 indicating the start of subscanning and center line 7 perpendicular to the main scanning direction, and scanner 10A provided in place of scanner 10 and including image sensor unit 11A of 1,024 photoelectric transducer elements (hereinafter referred to as elements) corresponding to table sheet 1A.

Figure 21:
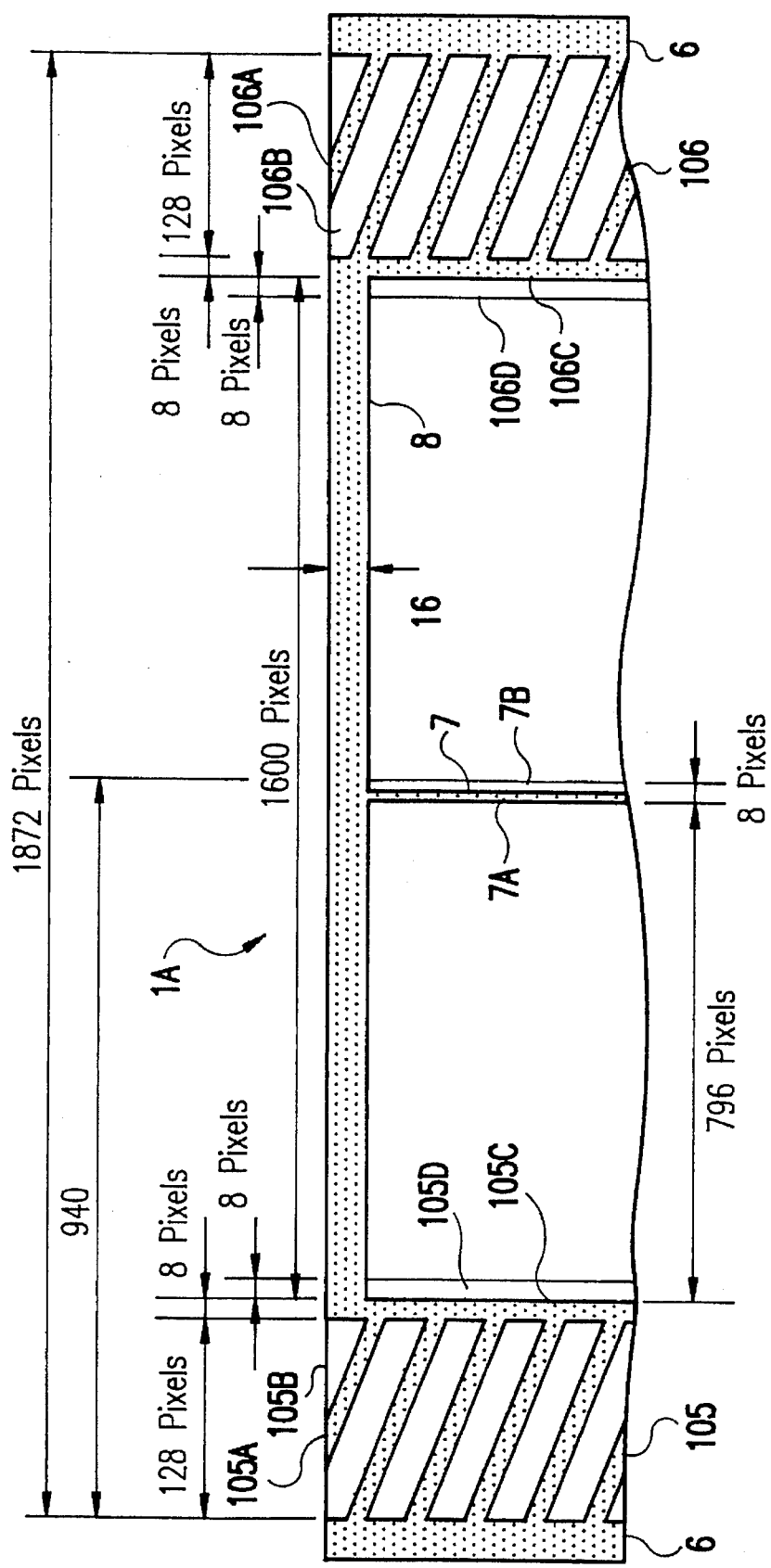
FIG. 21 is a partial plan view showing details of a table sheet of FIG. 20.

Referring to FIG. 21 which is a perspective view of table sheet 1A as viewed from an upper surface toward a lower surface of the same, table sheet 1A is formed from a transparent plastic film of 50 to 75 μm thick, similarly to table sheet 1 of FIG. 10(A), and has transparent document area 2A similar to document area 2, pattern areas 105 and 106 at the opposite end portions each having an oblique stripe pattern, a pair of black invalid areas 6 on the outer sides of pattern areas 105 and 106, center line 7 extending perpendicularly at a central portion of the main scanning direction and including black stripe 7A and white stripe 7B, and black start line 8.

The patterns of pattern areas 105 and 106 include inclined stripe patterns formed from black stripes 105A and 106A and white stripes 105B and 106B, respectively, inclined by about 30 degrees with respect to the main scanning line, that is, the CCD array of image sensor unit 11A, and vertical stripe patterns formed from black stripes 105C and 106C and white stripes 105D and 106D positioned on the inner sides of the inclined stripe patterns and extending perpendicularly to the main scanning direction.

The width of table sheet 1A in the main scanning direction includes the width of 1,872 picture elements to be read by the CCD array of image sensor unit 11A and the widths of the black invalid areas 6 at the opposite ends. The width of each of the inclined stripe patterns on the inner sides of the invalid areas 6 corresponds to 128 picture elements; and in each of the vertical stripe patterns on the inner sides of the inclined stripe patterns, the width of each of black stripes 105C and 106C corresponds to 8 picture elements, the width of each of the white stripes 105D and 106D corresponds to 8 picture elements, and the width of each of black stripe 7A and white stripe 7B of center line 7 corresponds to 4 picture elements. Accordingly, the width of the transparent document area of table sheet 1A corresponds to 1,584 picture elements, and the four picture elements at the center of the 1,584 picture elements corresponds to an opaque invalid area.

Some of the 1,024 picture elements of the CCD array of image sensor unit 11A are allocated to optical detection of pattern areas 105 and 106 and center line 7. The remaining elements of the CCD array are allocated to reading of original 4 through document area 2A.

Referring to FIG. 20(B), scanner 10A in the present embodiment includes, in addition to AGC circuit 12, black/white correction circuit 13 and binary digitization circuit 14 which are common to those of scanner 10 in the first embodiment, image sensor unit 1A of 1,024 elements provided in place of image sensor unit 11, movement detection circuit 25 for calculating the amount of movement of scanner 10A in the subscanning direction from the amount of movement in the main scanning direction from pattern area 105 and outputting corresponding subscanning timing pulses SD, another movement detection circuit 26 for calculating the amount of movement of scanner 10A in the main scanning direction from black and white vertical stripe patterns (hereinafter referred to as subscanning lines) 105C, 105D, 106C and 106D in pattern areas 105 and 106 and center line 7 extending in the subscanning direction perpendicular to the main scanning direction and outputting corresponding line synchronizing signal SH, inclination detection circuit 28 for calculating the inclination of a sensor line of scanner 10A with respect to the main scanning direction from the distance between two points at which a boundary line between subscanning lines 105C and 105D or a boundary line between subscanning lines 106C and 106D and a boundary between black stripe 7A and white stripe 7B of center line 7 cross with the sensor line of scanner 10A and generating inclination signal SK, buffer memory 16B for temporarily storing binary image data corresponding to document area 2A, data correction circuit 27 operable in response to movement detection signals SD and SH and inclination signal SK for producing predetermined correction data corresponding to the distances of relative movement in the subscanning direction and the main scanning direction from the image data stored in buffer memory 16B, and timing generation circuit 18A.

Next, operation of the present embodiment is described with reference to FIGS. 21 and 22. The number of picture elements of the CCD array of image sensor unit 11A of scanner 10A is 1,024 and smaller than that in the first embodiment while the width of original 4 corresponds to 1,600 picture elements similar to that in the first embodiment. Accordingly, in order to read the entire original 4, it is read twice separately for the left and right halves. Since the reading operations for the left and right halves of the original are same, only the reading operation for the left half of original 4 is described here.

First, scanner 10A is placed onto the left half of table sheet 1A placed on original 4 as shown in FIG. 20(A). In this instance, scanner 10A is placed so that the left end of left side pattern area 105 may be in register with the left end of the reading area of the width for the 1,024 elements (picture elements) of scanner 10A. In this condition, the right end of the reading area of scanner 10A is spaced by a distance corresponding to about 80 picture elements from the right of center line 7.

Reflected light of the image of original 4 having passed through table sheet 1A and reflected light from the stripe pattern inclined by about 30 degrees in pattern area 105 are received by image sensor unit 11A and projected onto the 1,024 elements of the CCD array by way of the lens system. Similarly as in the first embodiment, image sensor unit 11A performs, in response to data clock pulses and a scanning start signal from timing generation circuit 18A, sequential data reading operations of the 0th to 1,023rd photoelectric transducer elements and supplies analog read data signals to AGC circuit 12. The read data signals amplified by AGC circuit 12 are sequentially corrected in terms of illuminance dispersions of the LED light source and sensitivity dispersions of the elements by black/white correction circuit 13, converted by analog to digital conversion and supplied to binary digitization circuit 14. Binary digitization circuit 14 compares the digital signals supplied thereto with a preset threshold level to produce, at an output thereof, binary data consisting of black signals "1" corresponding to a signal equal to or higher than the threshold level and white signals "0" corresponding to another signal lower than the threshold level. Consequently, the 1,024 digital data signals are converted into binary data.

The binary data for the 1,024 picture elements are stored into buffer memory 16B. Meanwhile, those of the binary data for the 128 picture elements of the inclined stripe patterns corresponding to black stripes 105A and white stripes 105B of pattern area 105 are supplied to movement detection circuit 25, and movement detection circuit 25 thus analyzes the data for the 128 picture elements, and generates and supplies subscanning timing pulses SD to data correction circuit 27. Those of the binary data for the totaling 80 picture elements of the 16 picture elements of the vertical stripe patterns corresponding to black stripe 105C and white stripe 105D of pattern area 105 and the 32 picture elements corresponding to each of the front and the rear of vertical stripe patterns are supplied to movement detection circuit 26, and movement detection circuit 26 thus analyzes the data for the 80 picture elements, and generates and supplies line synchronizing signal SH to data correction circuit 27. Those of the binary data for the totaling 72 picture elements of the 8 picture elements of center line 7 and the 32 picture elements on each of the front and rear of center line 7 and those of the binary data for the totaling 80 picture elements of the 16 picture elements of the vertical stripe patterns and the 32 picture elements on each of the front and the rear of the vertical stripe patterns are supplied to inclination detection circuit 28, and inclination detection circuit 28 analyzes those data, and generates and supplies inclination signal SK to data correction circuit 27.

Operation of movement detection circuit 25 is similar to the operation of stripe analysis circuit 15 in the first embodiment.

Here, it is assumed that the resolution of the image reading apparatus of the present embodiment is 8 picture elements/mm in the main scanning direction and 8 scanning lines/mm in the subscanning direction similarly as in the first embodiment. Further, the field of view of each element of image sensor unit 11A is equal to the size of one picture element, that is, ⅛ mm×⅛ mm.

Figure 22:
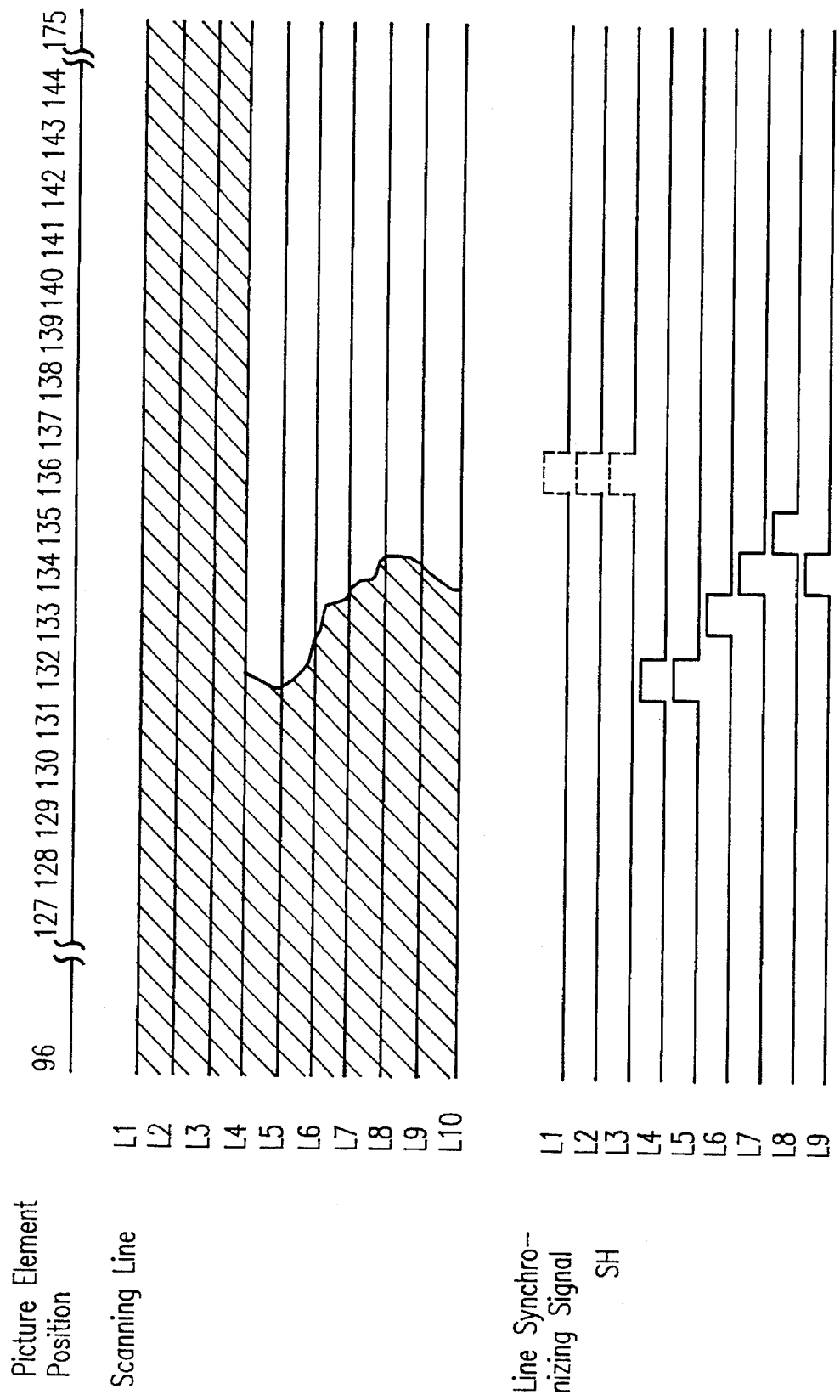
FIG. 22 is a view illustrating the relationship between a stripe pattern and scanning lines upon relative movement at a variable speed between the scanner and the table sheet in the present embodiment and showing a time chart of line synchronizing signals.

Next, operation of movement detection circuit 26 is described referring also to FIG. 22 which illustrates the movement of the field of view of an element of image sensor unit 11A upon relative movement of scanner 10A relative to table sheet 1A on main scanning lines L1 to L9 and line synchronizing signal SH which is an output of movement detection circuit 26 in this instance. Similarly as in the first embodiment, an element data reading sampling operation which is main scanning is repeated at a fixed sampling speed for each scanning start signal. Similarly, scanning lines L1 to L9 indicate start positions of scanning of those scanning lines. In particular, by movement in the subscanning direction, scanning of scanning line Ln is executed at an intermediate position between nth scanning line Ln and next scanning line Ln+1. Movement detection circuit 26 samples binary data of the 80 picture elements at picture element positions 96 to 175 of the CCD array of image sensor unit 11A of scanner 10A to detect a start line and the position in the main scanning direction.

Prior to reading of original 4, scanner 10A is placed onto start line 8 of table sheet 1A and starts its scanning from here. Slanting lines on scanning lines L1 to L3 in FIG. 22 indicate reading of start line 8. In this section, the position in the main scanning direction is not settled, and consequently, line synchronizing signal SH is not generated and accordingly remains at an L level. Or else, line synchronizing signal SH is outputted at picture element position 136, which is the reference position, as shown by a broken line. After scanning of start line 8 is completed, scanning of document area 2A is started with scanning line L4. Upon starting of scanning of document area 2A, scanning of the vertical stripe pattern of table sheet 1A, that is, scanning of black stripe 105C and white stripe 105D, is started. In this instance, at the reference position, the boundary point between black stripe 105C and while stripe 105D is at picture element position 136. The boundary point between black stripe 105C and white stripe 105D, however, can be detected within the offset of 32 picture elements. Movement detection circuit 26 detects the boundary point between black stripe 105C and white stripe 105D and generates line synchronizing signal SH. In other words, line synchronizing signal SH corresponding to one picture element at the boundary point is changed to an H level.

As a method of preventing an error in detection of movement in the main scanning direction, a succession of black stripes 105C or white stripes 105D on the front and the rear of the boundary point between black stripe 105C and white stripe 105D may be checked, or the displacement between the last scanning line and a current scanning line is detected to be within a fixed picture element distance.

Figure 23:
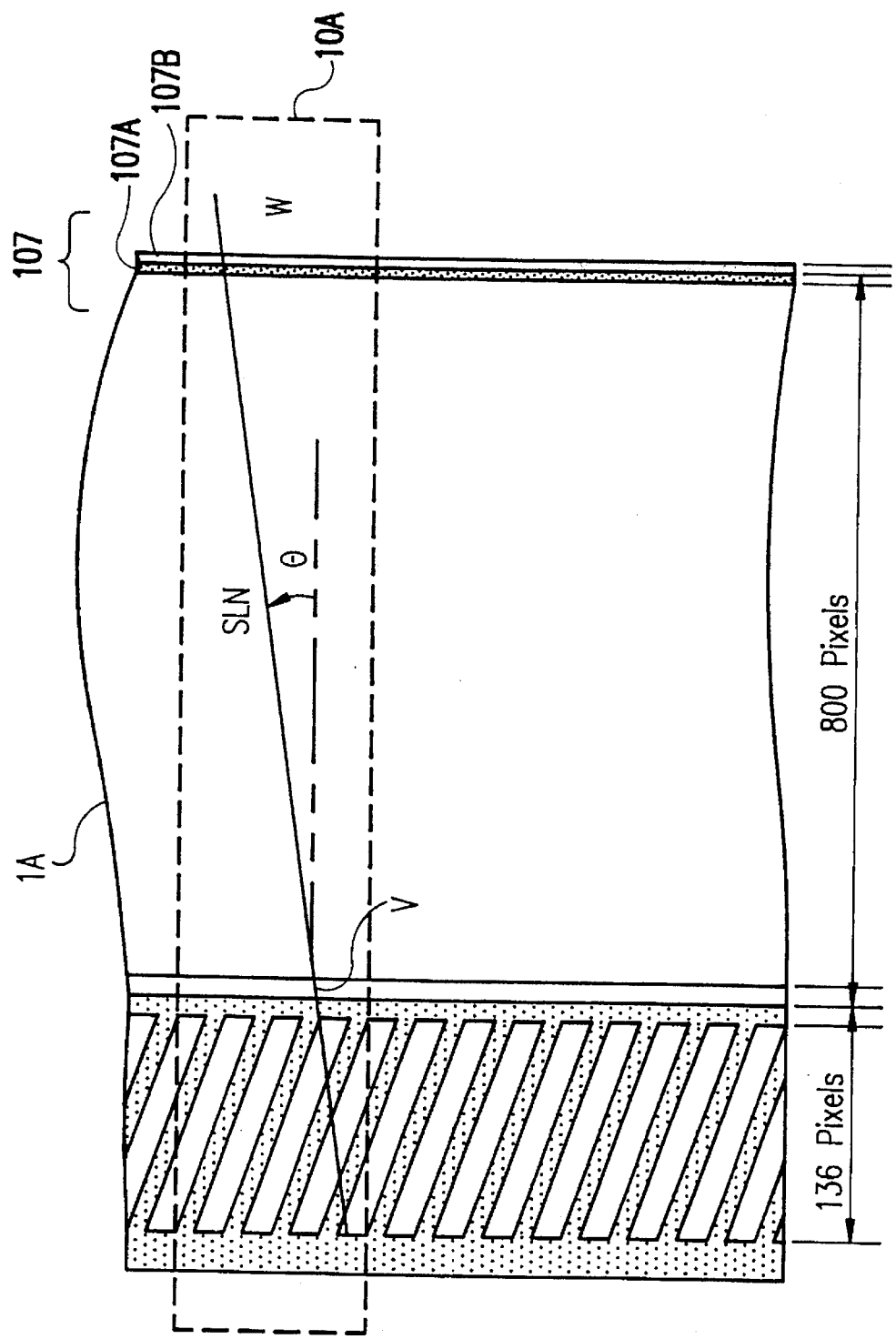
FIG. 23 is a diagrammatic view illustrating the positional relationship when the scanner is placed at a left half portion of the table sheet in the present embodiment.

Next, operation of inclination detection circuit 28 is described referring also to FIG. 23 which illustrates the positional relationship when scanner 10A is placed on the left half of table sheet 1A is described. Sensor line SLN of scanner 10A crosses at point V with a boundary line between black stripe 105C and white stripe 105D of the vertical stripe pattern, and crosses at point W with another boundary line between black stripe 7A and white stripe 7B of center line 7. Where the distance between points V and W is represented by m, angle θ at which sensor line SLN crosses with the main scanning direction of table sheet 1A is given by the following equation:

mcosθ=800 (picture elements)

$$\theta = \cos^{-1}(800/m) \qquad (1)$$

Point V is detected in such a manner as described above by position detection circuit 26. Also point W is detected by a similar technique to that for point V by inclination detection circuit 28. Distance m between points V and W can be determined from the positions of points V and W on sensor line SLN. Accordingly, angle θ at which sensor line SLN crosses with the main scanning direction of table sheet 1A is calculated from equation (1). If the offset angle of sensor line SLN in the present embodiment is 5.7 degrees, the allowable range of angle θ in reading scanning is 0 to 10 degrees; and when θ=0 degrees, m=800 picture elements; when θ=5.7 degrees, m=804 picture elements; and when θ=10 degrees, m=812 picture elements. Further, although the data are same between a case wherein the direction of angle θ is that indicated by an arrow and another case wherein the direction of angle θ is opposite to that indicated by the arrow, the operator can readily determine in which direction angle θ is, and the image can be corrected to a correct position by data correction circuit 27.

Next, operation of data correction circuit 27 is described. Data correction circuit 27 corrects binary image data temporarily stored in buffer memory 16B in the following procedure.

First, the eighth picture element from the position of line synchronizing signal SH is determined as the first picture element of each scanning line. In the example of FIG. 22, since line synchronizing signals SH on scanning lines L4 and L5 are at picture element position 132, picture element position 140 is determined as the first picture element in scanning of scanning lines L4 and L5.

Then, correction in terms of movement in the subscanning direction is performed in accordance with a result of detection of movement detection circuit 25 in a similar manner as in the second embodiment. Finally, correction in terms of the inclination is performed in accordance with inclination signal SK.

After reading of the left half of original 4 by scanner 10A is completed in this manner, scanner 10A is placed onto the right half of table sheet 1A. In this instance, scanner 10A is placed so that the right end of right pattern area 106 may be in register with the right end of the 1,024 elements of the reading area of scanner 10A. Further, prior to reading of the right half of original 4, scanner 10A is placed onto start line 8 of table sheet 1A and starts its scanning from here. Consequently, the right half of the original can be read in a similarly manner as in that of the left half.

Here, although the original at the four picture elements of black stripe 7A on center line 7 of table sheet 1A cannot be read, the data at the portion can be corrected from information at the left and right portions to this portion by data correction circuit 27. For example, data at the left two picture elements and the right two picture elements of black stripe 7A are regarded as same as the adjacent left and right two picture elements, respectively.

Figure 24:
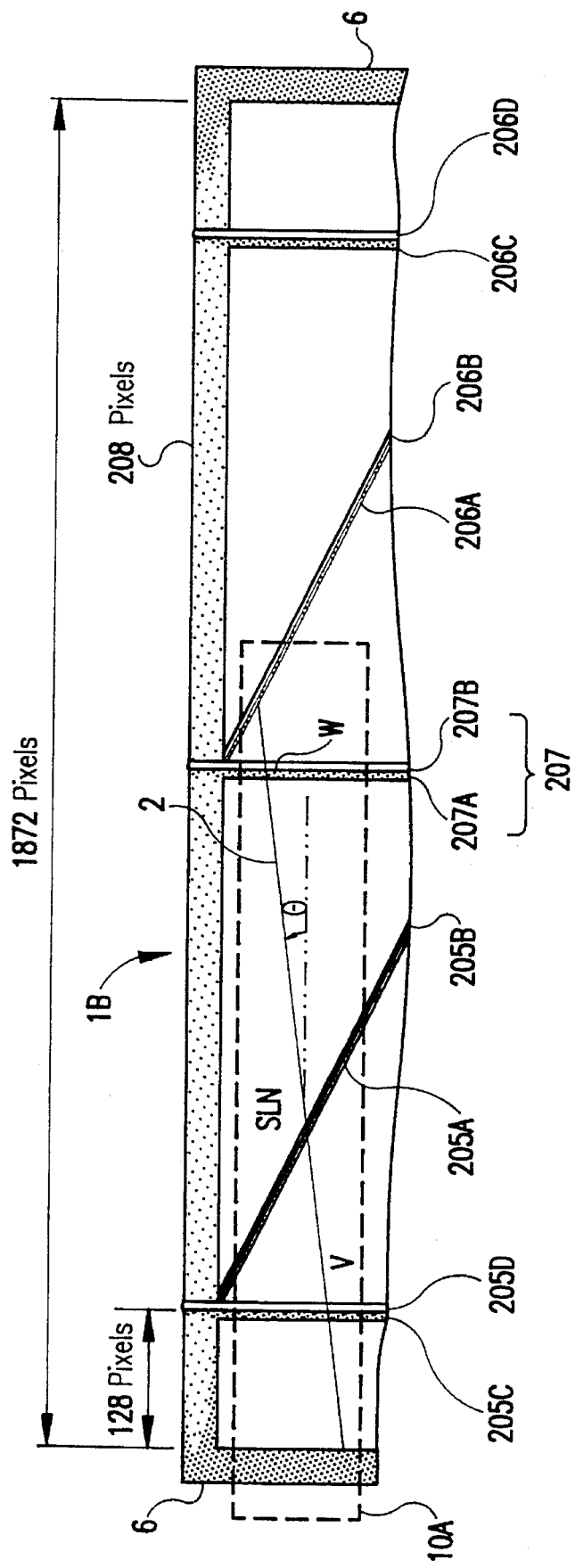
FIG. 24 is a partial plan view showing details of a table sheet in a fourth embodiment of the present invention.

Next, referring to FIG. 24 which shows table sheet 1B, which characterizes a fourth embodiment of the present invention, as viewed from an upper surface toward a lower surface of the same and simultaneously illustrates the positional relationship when scanner 10A is placed on the left half of table sheet 1B, table sheet 1B in the present embodiment is different from table sheet 1A in the third embodiment in that it has, in transparent document area 2A surrounded by start line 208 and invalid areas 6, black and white stripes 205A and 205B and black and white stripes 206A and 206B each in the form of an inclined stripe pattern having a width corresponding to two picture elements in the main scanning direction, black and white stripes 205C and 205D and black and white stripes 206C and 206D provided in place of black and white strips 105A, 105B and 106A, 106B, respectively, and having vertical stripe patterns each of which has a width corresponding to two picture elements in the main scanning direction and extends perpendicularly to the main scanning direction so that it cuts start line 208, center line 207 provided in place of center line 7 and formed from black and white stripes 207A and 207B having vertical stripe patterns each of which has a width corresponding to two picture elements in the main scanning direction and cuts start line 208, and start line 208 provided in place of start line 8 which extends in the main scanning direction, and accommodating the ends of white stripes 205D, 206D and 207B in the black stripe thereof.

In a reading operation in the present embodiment, an original placed under table sheet 1B is read twice separately for left and right halves thereof by scanner 10A similarly as in the third embodiment.

A reading operation of the left half of an original similarly as in the third embodiment is described referring to FIGS. 24 and 20(B). First, scanner 10A is placed onto start line 208 of table sheet 1B and starts its scanning from here. The present embodiment is different from the third embodiment in that white stripes 205D, 207B and 206D are present within black start line 208 as described above, and consequently, the position in the main scanning direction can be detected by reading start line 208.

Picture signals read by image sensor unit 11A of scanner 10A are converted into binary data by way of AGC circuit 12, black/white correction circuit 13 and binary digitization circuit 14 and stored into buffer memory 16B and then supplied to movement detection circuit 25 similarly to the operation of the third embodiment.

Figure 25:
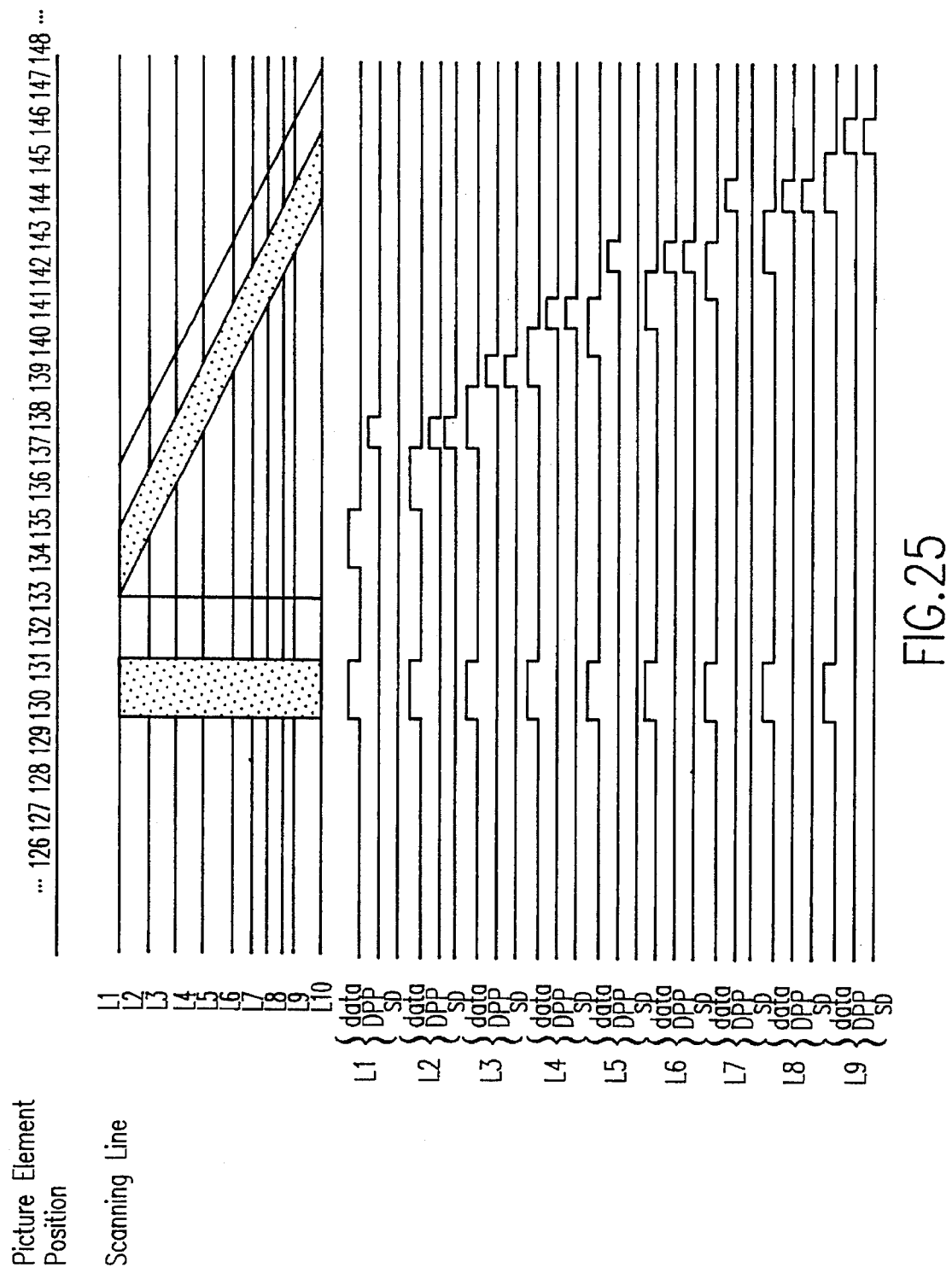
FIG. 25 is a view illustrating the relationship between a stripe pattern and scanning lines upon relative movement at a variable speed between a scanner and the table sheet in the present embodiment and showing a time chart of corresponding signals.

Referring also to FIG. 25 which illustrates the movement of the field of view of the element of image sensor unit 11A upon relative movement between scanner 10A and the table sheet 1B at main scanning lines L1 to L9, element data reading sampling operation which is main scanning is repeated at a fixed sampling speed for each scanning start signal.

As described above, in order to allow detection of the distance of movement of each ⅛ mm which is the nominal scanning line distance, the inclined stripe patterns on the opposite sides of document area 2A are inclined by about 30 degrees with respect to the main scanning direction, and black/white boundary point detection position DPP is set by movement detection circuit 25. Movement detection circuit 25 discriminates whether or not the distance between adjacent scanning lines reaches ⅛ mm as a result of relative movement of scanner 10A, and generates subscanning timing pulse SD. Black/white boundary point detection position DPP is a detection window of the size of one picture element, that is, ⅛ mm. The initial position of black/white boundary point detection position DPP is set to picture element position 136.

Figure 1A:
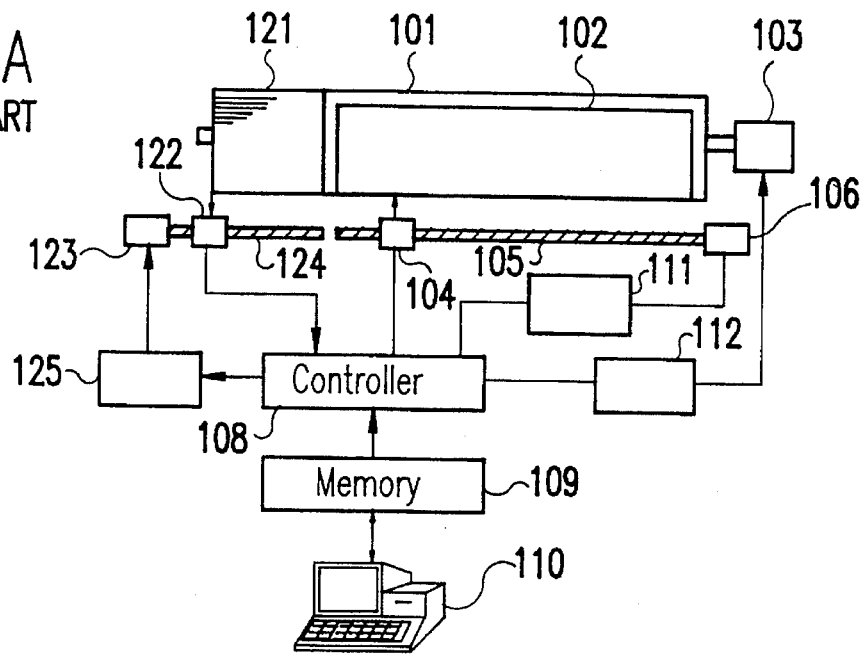
FIG. 1(A) is a block diagram showing the construction of a first conventional image reading apparatus.
Figure 1B:
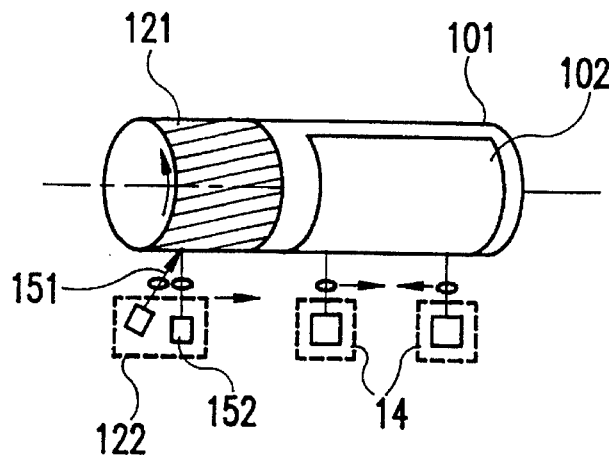
FIG. 1(B) is a schematic view showing details of a cylinder of the image reading apparatus of FIG. 1(A)
Figure 1C:
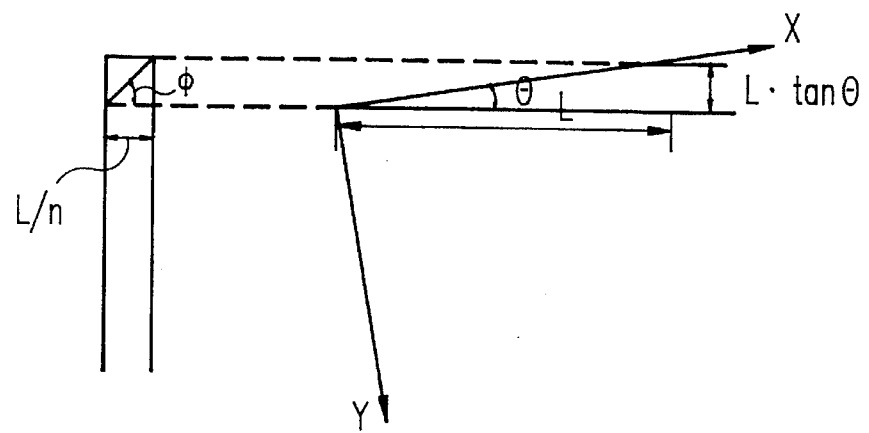
FIG. 1(C) is a diagrammatic view illustrating the relationship between inclination angle $\phi$ of a line code and lead angle $\theta$.
Figure 2:
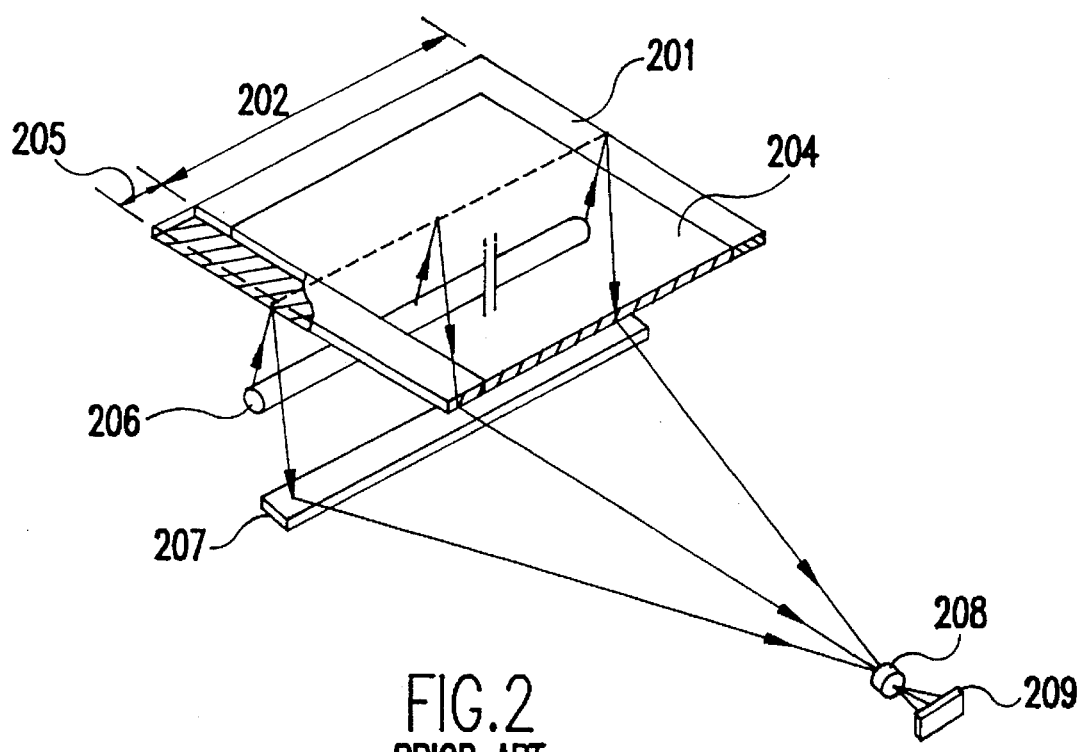
FIG. 2 is a schematic appearance view showing principal components of a second conventional image reading apparatus.
Figure 3:
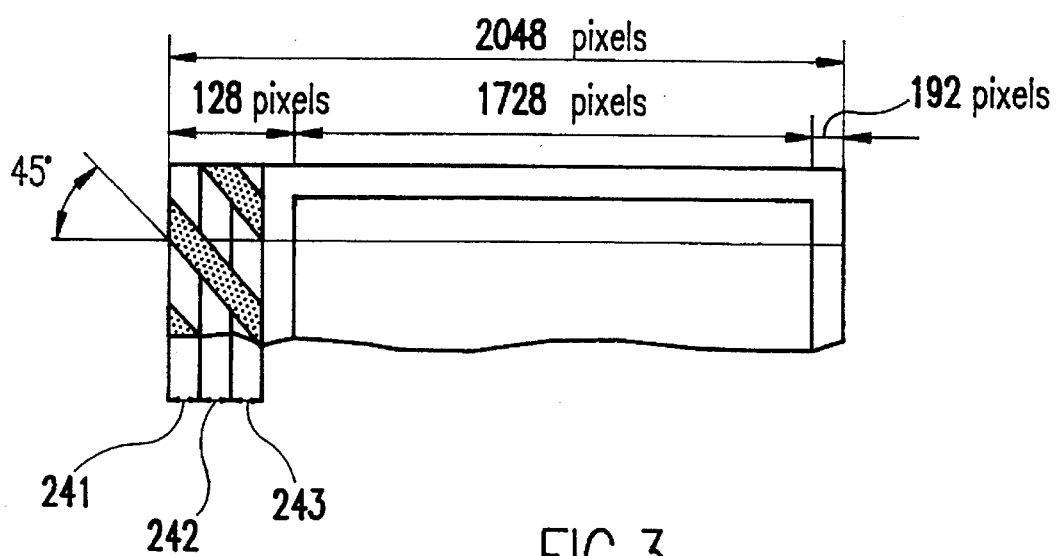
FIG. 3 is a partial plan view showing details of a document table of FIG. 2.
Figure 4:
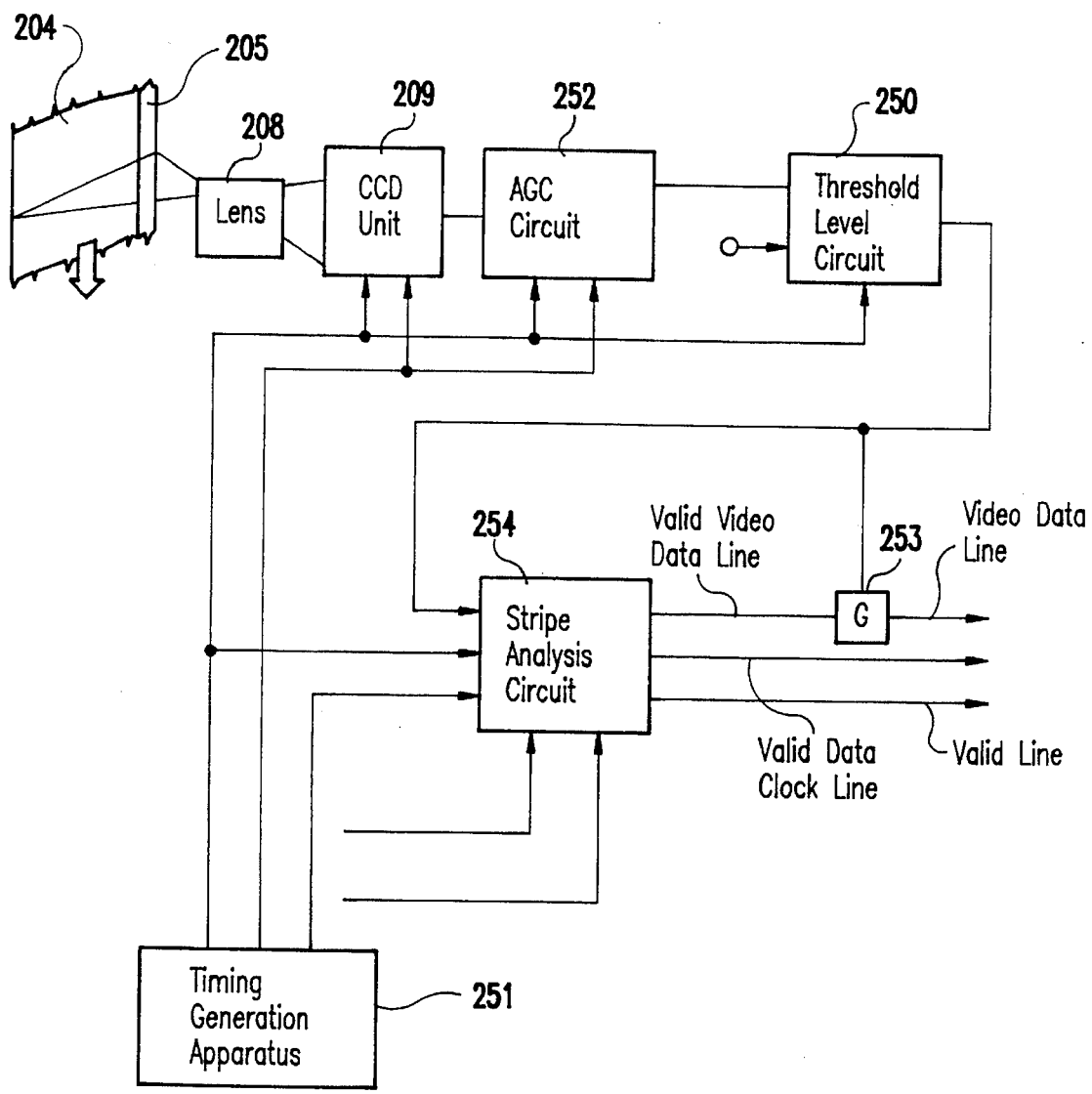
FIG. 4 is a block diagram showing the construction of the image reading apparatus of FIG. 2.
Figures 5A, 5B:
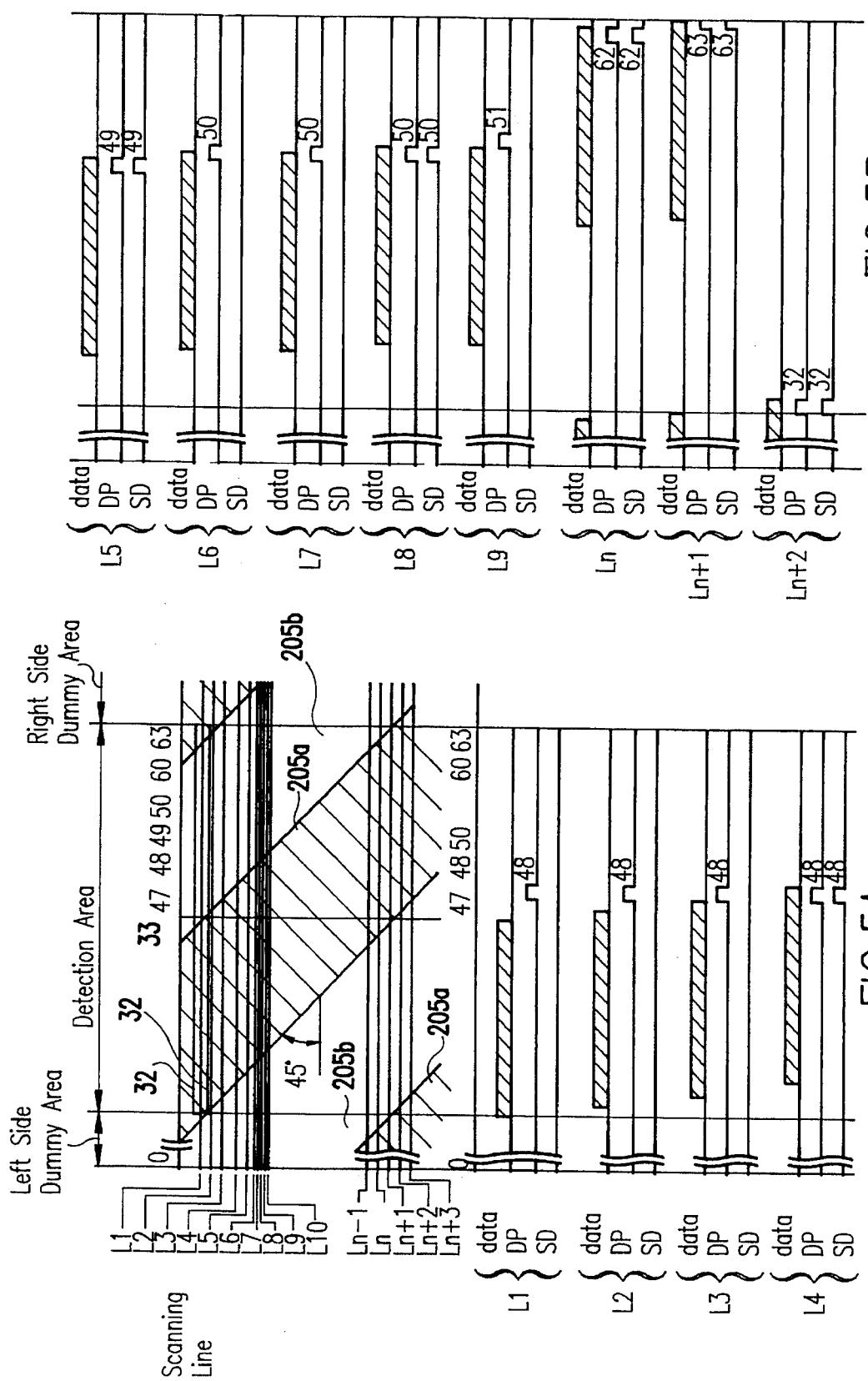
FIGS. 5(A) and 5(B) are diagrammatic views illustrating the relationship between stripe patterns and scanning lines upon relative movement between an original and a CCD unit of FIG. 2 and showing a time chart of corresponding signals.
Figure 6:
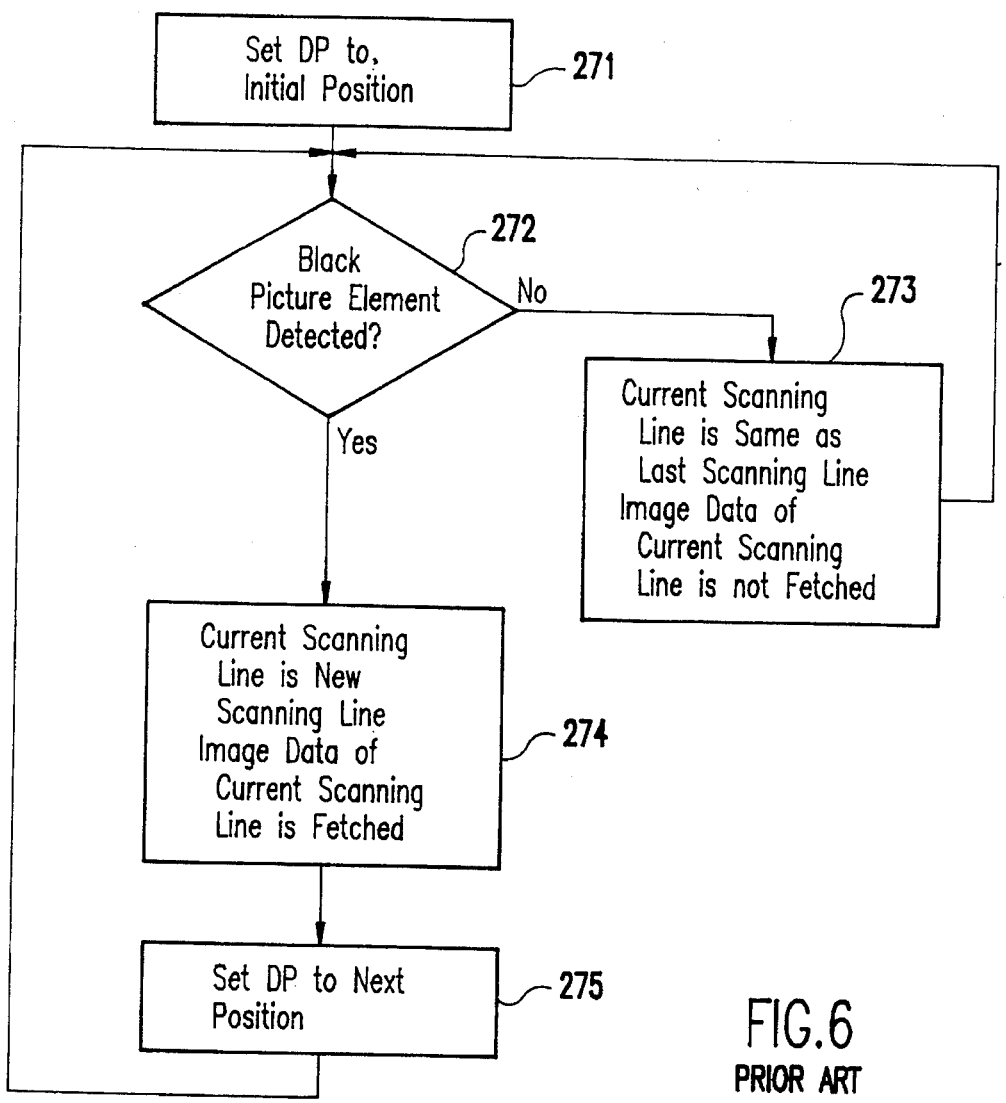
FIG. 6 is a flow chart illustrating operation of the image reading apparatus of FIG. 2.
Figure 7:
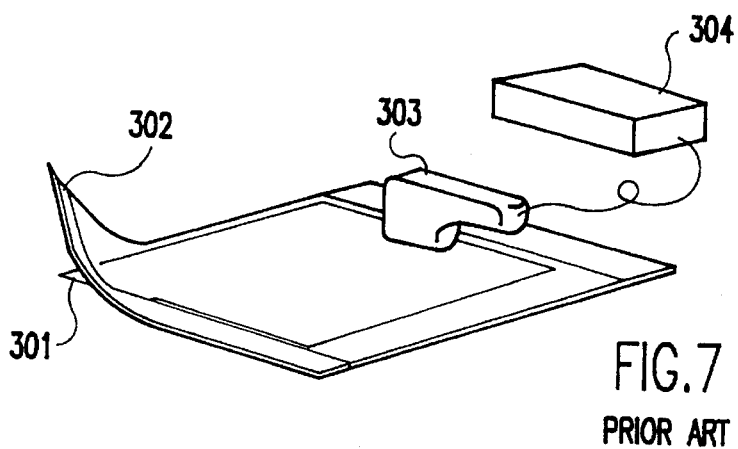
FIG. 7 is a perspective view of a third conventional image reading apparatus in an image reading condition.
Figure 8A:
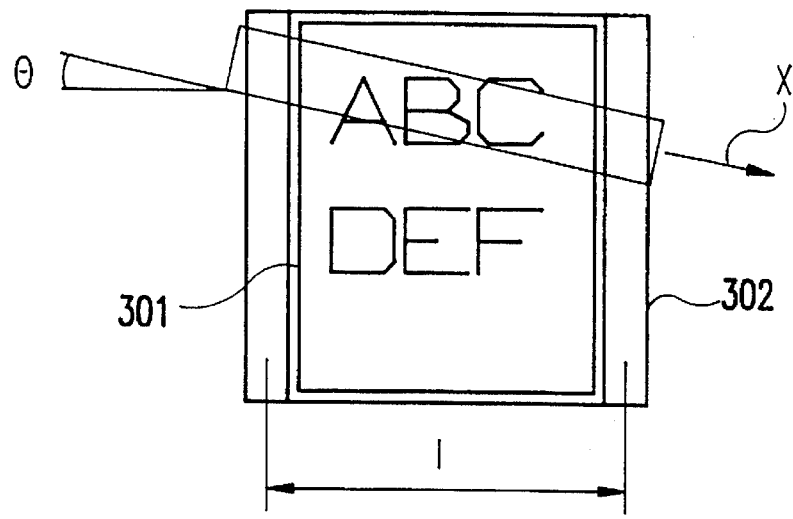
FIG. 8(A) is a diagrammatic view illustrating a condition wherein image information is read in an inclined condition by angle $\theta$ by a hand scanner of FIG. 7.
Figure 8B:
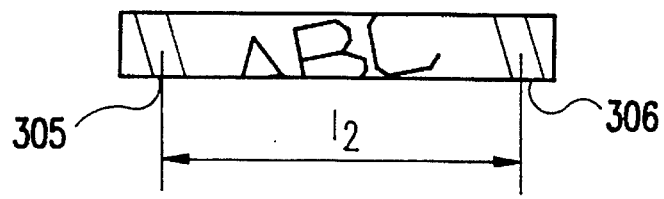
FIG. 8(B) is a diagrammatic view illustrating image information thus read.
Figure 8C:
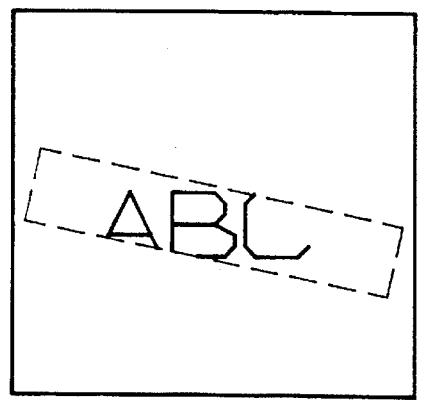
FIG. 8(C) is a diagrammatic view illustrating a restored condition of the image information of FIG. 8(B)

Setting of the initial position of black/white boundary point detection position DPP, generation of subscanning timing pulse SD corresponding to each scanning line an movement of the detection position to a next picture element position are basically similar to the operations of stripe analysis circuit 15 in the first embodiment, and by reading the black element as the black/white boundary point, detection position DP as detection position DPP, buffer memory 16 as buffer memory 16B and picture element positions 50, 52, 54 and 56 as picture element positions 136, 138, 140 and 142, respectively, the operations are indicated by the flow chart of FIG. 7 of the first embodiment and the description of the flow chart.

Since a stripe pattern is present in document area 2A of table sheet 1B, contents of the original may possibly be detected as a black/white boundary point in error. To prevent this, the width of each of the black stripes and the white stripes, which corresponds to two picture elements in the present embodiment, may be increased. In this instance, however, it is difficult to correct contents of the original under a stripe pattern using data around the stripe pattern. As another detection error prevention method, a plurality of stripe patterns may be provided.

Next, while operation of movement detection circuit 26 is similar to that in the third embodiment, since the position in the main scanning direction can be detected by reading of start line 208, the control is facilitated comparing with that in the third embodiment.

Operation of inclination detection circuit 28 is similar to that in the third embodiment, and the inclination is calculated from a boundary point between black stripe 205C and white stripe 205D and another boundary point between black stripe 207A and white stripe 207B.

In the fourth embodiment, since pattern areas 105 and 106 in the third embodiment are unnecessary, the width of the original within which image data can be read can be increased as much.

Figure 26:
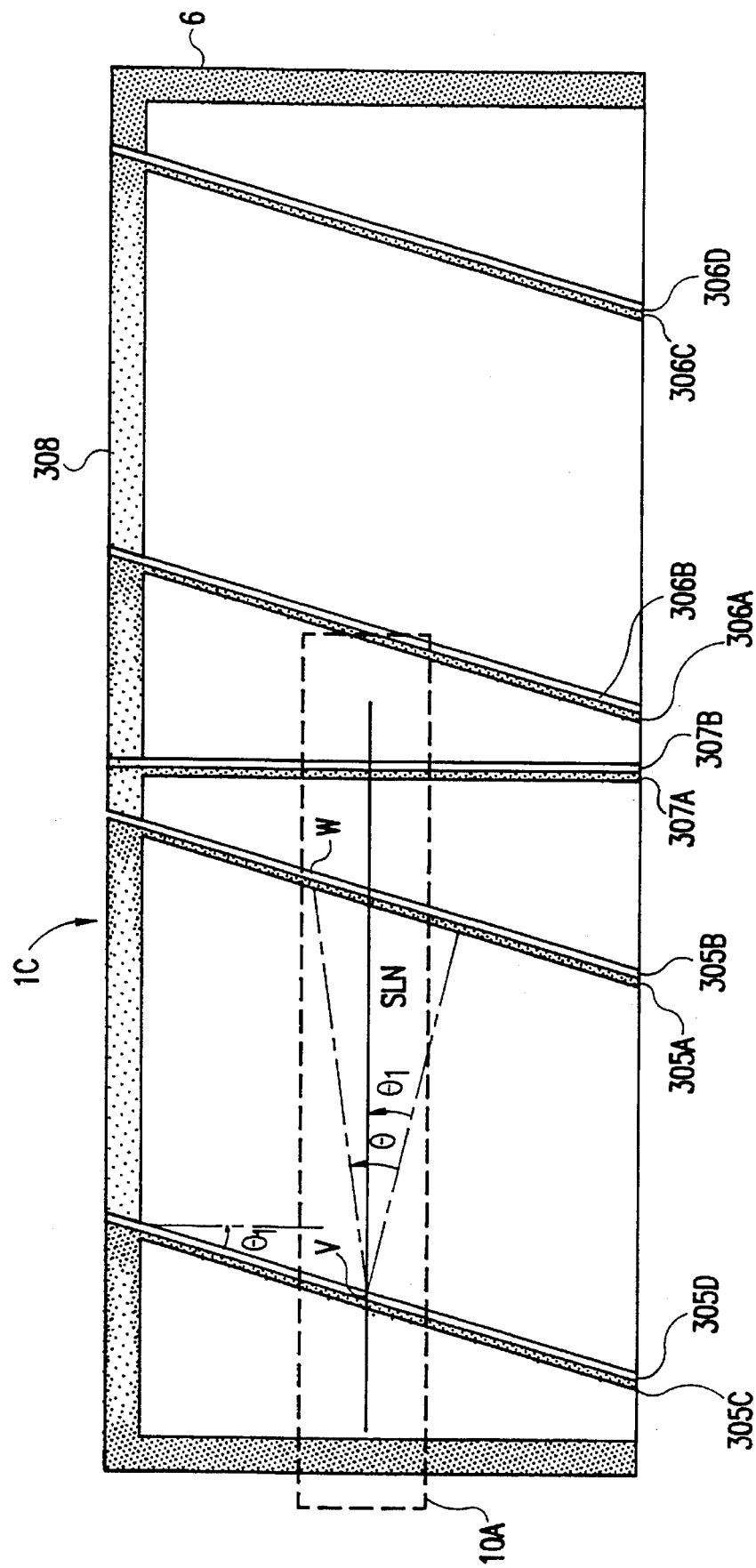
FIG. 26 is a partial plan view showing details of a table sheet in a fifth embodiment of the present invention.

Next, referring to FIG. 26 which shows table sheet 1C, which characterizes a fifth embodiment of the present invention, as viewed from an upper surface toward a lower surface of the same and simultaneously illustrates the positional relationship when scanner 10A is placed on the left half of table sheet 1C, table sheet 1C in the present embodiment is different from table sheet 1B in the fourth embodiment in that parallel stripe patterns 305A, 305B, 305C, 305D, 306A, 306B, 306C and 306D for use for detection of an inclination extend not in parallel to the subscanning direction but in an inclined relationship to the subscanning direction by angle $\theta_1$. By this means, sensor line SLN of scanner 10A can be made coincide with the main scanning direction. Sensor line SLN crosses at point V with a boundary line between black stripe 305C and white stripe 305D and at point W with another boundary line between black stripe 305A and white stripe 305B of center line 307. The distance between lines formed by black/white boundary points of the parallel stripe patterns is set to 500 picture elements.

Where the distance between points V and W is represented by n, the angle at which sensor line SLN crosses with the main scanning direction of table sheet 1C is given by the following calculation:

Points V and W are detected in a similar manner as in the third embodiment by movement detection circuit 26 and inclination detection circuit 28. Next, distance n between points V and W is calculated from the positions of points V and W on sensor line SLN. Then, angle θ between sensor line SLN and a vertical line from point V to black stripe 305A is given by following equation (2).

ncosθ=500 (picture elements)

$$\theta = \cos^{-1}(500/n) \qquad (2)$$

When $\theta = \theta_1$ in FIG. 26, sensor line SLN coincides with the main scanning direction as indicated by a solid line. On the other hand, when sensor line SLN is inclined with respect to the main scanning direction as indicated by an alternate long and short dash line (line V–W), inclination angle θ is calculated in accordance with equation (2), and the angle between sensor line SLN and the main scanning direction is given by $\theta - \theta_1$.

While the direction of the inclination of the scanner is determined by discrimination of the operator in the third and forth embodiments, in the fifth embodiment, the inclination in the reverse direction with respect to the main scanning direction can be detected only if inclination angle θ is within angle $\theta_1$.

Upon scanning of start line 308, it is possible to detect, from the position of a stripe pattern, which one of the left half and the right half of table sheet 1C is scanned, or the operator can instruct the image reading apparatus of the present embodiment which one of the left half and the right half should be scanned. Further, by dividing scanning not into two times for the left and right halves of the table sheet but into three or more times, the size of scanner 10A can be further reduced.

As described above, according to the image reading apparatus of the present invention, since the reading resolution in the subscanning direction is varied in response to the variation of the speed of relative movement in the subscanning direction, the image reading apparatus is advantageous in that, at a portion where characters or an image of an original is comparatively fine, the speed of movement can be reduced to raise the resolution to achieve enhancement of the picture quality, but at another portion where characters or an image is comparatively rough, the speed of movement can be raised to achieve an increase of the image reading speed.

The image reading apparatus is further advantageous in that the movement for the subscanning direction allows both of forward and reverse directions, and consequently, convenience in use is good and the reading efficiency can be enhanced.

Further, the image reading apparatus is advantageous in that, since a table sheet including a stripe pattern for detection of the speed of movement is provided separately, the body of the scanner can be reduced in size and weight.

Furthermore, the image reading apparatus is advantageous in that, since the relative position is recorded in the form of a stripe pattern as position information recorded on the table sheet, the cost of the table sheet is low and the accuracy in position detection can be enhanced.

What is claimed is:

1. An image reading apparatus, comprising:

a scanning section including an electro-optical conversion apparatus for electro-optically scanning, by means of a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including a stripe pattern disposed in parallel to the subscanning direction along a side of the original area and formed from black and white stripes having a predetermined inclination with respect to the main scanning direction and predetermined widths;

pattern signal production means for electro-optically scanning the stripe pattern in the main scanning direction to produce a pattern signal of a predetermined resolution corresponding to the stripe pattern;

movement detection means for detecting, in response to the pattern signal supplied thereto, that the stripe pattern moves in the main scanning direction by a distance corresponding to relative movement of said scanning section to the original by a predetermined distance in the subscanning direction to produce a movement detection signal;

storage control means for storing the image data signals into a buffer memory for each of the main scanning periods; and corrected data production means for producing, in response to the movement detection signal outputted from said movement detection means, corrected data corresponding to the distance of the relative movement of said scanning section in the subscanning direction from the image data signals stored in said buffer memory.

2. An image reading apparatus as claimed in claim 1, further comprising a hand scanner which includes said scanning section including said pattern signal production means, said movement detection means, said storage control means and said corrected data production means and operable by hand to effect relative movement in the subscanning direction, and said table sheet.

3. An image reading apparatus according to claim 1, wherein all of a plurality of scanned data lines of said original scanned by said scanning section contribute to form an image of the original regardless of variations of relative speed between said original and said scanning section, such that the relative speed therebetween is selectively adjustable depending upon a characteristic of said image.

4. An image reading apparatus according to claim 1, wherein said image formed by said image reading apparatus is formed by substantially all of said image data signals to thereby form an image of said original regardless of variations in relative speed between said scanning section and said original.

5. An image reading apparatus, comprising:

a scanning section including an electro-optical conversion apparatus for electro-optically scanning, by a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including a stripe pattern disposed in parallel to the subscanning direction along a side of the original area and formed from black and white stripes having a predetermined inclination with respect to the main scanning direction and predetermined widths;

pattern signal production means for electro-optically scanning the stripe pattern in the main scanning direction to produce a pattern signal of a predetermined resolution corresponding to the stripe pattern;

movement detection means for detecting, in response to the pattern signal supplied thereto, that the stripe pattern moves in the main scanning direction by a distance corresponding to relative movement of said scanning section to the original by a predetermined distance in the subscanning direction to produce a movement detection signal;

storage control means for storing the image data signals into a buffer memory for each of the main scanning periods; and corrected data production means for producing, in response to the movement detection signal outputted from said movement detection means, corrected data corresponding to the distance of the relative movement of said scanning section in the subscanning direction from the image data signals stored in said buffer memory, wherein said movement detection means includes a detection window having a size equal to the size of a unit picture element corresponding to the resolution, which can be set to an arbitrary picture element position of the pattern area in the main scanning direction, and upon scanning of the pattern area in the main scanning direction, said movement detection means produces the movement detection signal when said detection window coincides with the black stripe, a next main scanning period being repeated after said detection window is shifted by a distance corresponding to a preset number of picture elements equal to or greater than one in the main scanning direction in response to a subscanning timing signal produced in response to the movement detection signal.

6. An image reading apparatus according to claim 5, wherein all of a plurality of scanned data lines of said original scanned by said scanning section contribute to form an image of the original regardless of variations of relative speed between said original and said scanning section, such that the relative speed therebetween is selectively adjustable depending upon a characteristic of said image.

7. An image reading apparatus, comprising:

a scanning section including an electro-optical conversion apparatus for electro-optically scanning, by a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including a stripe pattern disposed in parallel to the subscanning direction along a side of the original area and formed from black and white stripes having a predetermined inclination with respect to the main scanning direction and predetermined widths;

pattern signal production means for electro-optically scanning the stripe pattern in the main scanning direction to produce a pattern signal of a predetermined resolution corresponding to the stripe pattern;

movement detection means for detecting, in response to the pattern signal supplied thereto, that the stripe pattern moves in the main scanning direction by a distance corresponding to relative movement of said scanning section to the original by a predetermined distance in the subscanning direction to produce a movement detection signal;

storage control means for storing the image data signals into a buffer memory for each of the main scanning periods; and corrected data production means for producing, in response to the movement detection signal outputted from said movement detection means, corrected data corresponding to the distance of the relative movement of said scanning section in the subscanning direction from the image data signals stored in said buffer memory, wherein, when the image data signals stored into said buffer memory within one detection interval between productions of successive two movement detection signals a plurality of main scanning lines corresponding to a plurality of the main scanning periods, an average value of data corresponding to picture elements at a same position in the plurality of main scanning lines is produced as the corrected data in response to the second movement detection signal of the two movement detection signals, but when the image data signals stored into said buffer memory within the one detection interval are image data signals within less than one scanning period, an image data signal corresponding to the last one main scanning period is produced as the corrected data in response to the movement detection signal.

8. An image reading apparatus, comprising:

a scanning section including an electro-optical conversion apparatus for electro-optically scanning, by a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including a stripe pattern disposed in parallel to the subscanning direction along a side of the original area and formed from black and white stripes having a predetermined inclination with respect to the main scanning direction and predetermined widths;

pattern signal production means for electro-optically scanning the stripe pattern in the main scanning direction to produce a pattern signal of a predetermined resolution corresponding to the stripe pattern;

movement detection means for detecting, in response to the pattern signal supplied thereto, that the stripe pattern moves in the main scanning direction by a distance corresponding to relative movement of said scanning section relative to the original by a predetermined distance in the subscanning direction to produce a movement detection signal and for generating, as subscanning data, the number of said main scanning lines of the image data included in the range of the relative movement of said scanning section by the predetermined distance in the subscanning direction; and a buffer memory for storing the image data signals and the subscanning data for each of the main scanning periods.

9. An image reading apparatus as claimed in claim 8, further comprising image reproduction means for reproducing the image of the original from the image data signals and the subscanning data read out from said buffer memory.

10. An image reading apparatus according to claim 9, wherein all of a plurality of scanned data lines of said original scanned by said scanning section contribute to form an image of the original regardless of variations of relative speed between said original and said scanning section, such that the relative speed therebetween is selectively adjustable depending upon a characteristic of said image.

11. An image reading apparatus according to claim 8, wherein all of a plurality of scanned data lines of said original scanned by said scanning section contribute to form an image of the original regardless of variations of relative speed between said original and said scanning section, such that the relative speed therebetween is selectively adjustable depending upon a characteristic of said image.

12. An image reading apparatus, comprising:

a scanning section including an electro-optical conversion apparatus for electro-optically scanning, by a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including a first stripe pattern disposed in parallel to the subscanning direction at least on one side of the original area and formed from black and white stripes having a predetermined inclination with respect to the main scanning direction and predetermined widths and at least two second stripe patterns formed from black and white stripe patterns of predetermined widths and extending in parallel to the subscanning direction;

pattern signal production means for electro-optically scanning the first and second stripe patterns in the main scanning direction to produce a pattern signal of a predetermined resolution corresponding to the first and second stripe patterns;

first movement detection means for detecting, in response to the pattern signal supplied thereto, that the first stripe pattern moves in the main scanning direction by a distance corresponding to relative movement of said scanning section relative to the original by a predetermined distance in the subscanning direction to produce a first movement detection signal;

second movement detection means for detecting, in response to the pattern signal supplied thereto, movement of the second stripe patterns in the main scanning direction when the direction of the movement of said scanning section is deflected from the subscanning direction to produce relative movement with respect to the original by a distance greater than a predetermined distance in the main scanning direction to produce a second movement detection signal;

inclination detection means for measuring, in response to the pattern signal supplied thereto, the distance between two adjacent ones of the plurality of second stripe patterns to detect an inclination of said linear array with respect to the main scanning direction to produce an inclination signal;

storage control means for storing the image data signals into a buffer memory for each of the main scanning periods; and corrected image data production means for producing, in response to the first and second movement detection signals, corrected image data corresponding to the distances of relative movement in the subscanning direction and the main scanning direction from the image data signals stored in said buffer memory.

13. An image reading apparatus as claimed in claim 12, further comprising a hand scanner which includes said scanning section including said pattern signal production means, said movement detection means, said storage control means and said corrected data production means and operable by hand to effect relative movement in the subscanning direction, and said table sheet.

14. An image reading apparatus as claimed in claim 8, wherein said table sheet is provided with a center line which is one of said second stripe patterns and disposed at a central portion of the original area, and further with a start line formed from a black line of a predetermined width disposed in parallel to the main scanning direction and serving as a reference line for starting of the subscanning, and one first stripe pattern and one second stripe pattern each are disposed on the opposite sides of the center line, and said hand scanner includes said scanning section having a length sufficient to scan, by main scanning, the first and the second stripe patterns on the left or the right of the center line including the center line.

15. An image reading apparatus, comprising:

a scanning section including an electro-optical conversion apparatus for electro-optically scanning, by a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including at least one first stripe pattern formed from black and white stripes disposed in the original area and having a predetermined inclination with respect to the main scanning direction and predetermined widths and at least two second stripe patterns formed from black and white stripe patterns of predetermined widths and extending in parallel to the subscanning direction;

pattern signal production means for electro-optically scanning the first and second stripe patterns in the main scanning direction to produce a pattern signal of a predetermined resolution corresponding to the first and second stripe patterns;

first movement detection means for detecting, in response to the pattern signal supplied thereto, that the first stripe pattern moves in the main scanning direction by a distance corresponding to relative movement of said scanning section relative to the original by a predetermined distance in the subscanning direction to produce a first movement detection signal;

second movement detection means for detecting, in response to the pattern signal supplied thereto, movement of the second stripe patterns in the main scanning direction when the direction of the movement of said scanning section is deflected from the subscanning direction to produce relative movement with respect to the original by a distance greater than a predetermined distance in the main scanning direction to produce a second movement detection signal;

inclination detection means for measuring, in response to the pattern signal supplied thereto, the distance between two adjacent ones of the plurality of second stripe patterns to detect an inclination of said linear array with respect to the main scanning direction to produce an inclination signal;

storage control means for storing the image data signals into a buffer memory for each of the main scanning periods; and corrected image data production means for producing, in response to the first and second movement detection signals, corrected image data corresponding to the distances of relative movement in the subscanning direction and the main scanning direction from the image data signals stored in said buffer memory.

16. An image reading apparatus as claimed in claim 15, further comprising a hand scanner which includes said scanning section including said pattern signal production means, said movement detection means, said storage control means and said corrected data production means and operable by hand to effect relative movement in the subscanning direction, and said table sheet.

17. An image reading apparatus as claimed in claim 16, wherein said table sheet is provided with a center line which is one of said second stripe patterns and disposed at a central portion of the original area, and further with a start line formed from a black line of a predetermined width disposed in parallel to the main scanning direction and serving as a reference line for starting of the subscanning, one first stripe pattern and one second stripe pattern each are disposed on the opposite sides of the center line, and said hand scanner includes said scanning section having a length sufficient to scan, by main scanning, the first and the second stripe patterns on the left or the right of the center line including the center line.

18. An image reading apparatus, comprising:

a scanning section including an electro-optical conversion apparatus for electro-optically scanning, by a plurality of photoelectric transducer elements disposed in a linear array, an original in predetermined main scanning periods in a direction of a main scanning line along the direction of said linear array to convert an image of the original into image data signals and for moving in a subscanning direction perpendicular to the main scanning direction relative to the original;

a table sheet for being placed in an overlapping relationship on the original and having a transparent original area to allow the original to be observed therethrough and a pattern area including at least two first stripe patterns formed from black and white stripes disposed in the original area and having a predetermined inclination with respect to the main scanning direction and predetermined widths and at least one second stripe pattern formed from black and white stripe patterns of predetermined widths and extending in parallel to the subscanning direction;

pattern signal production means for electro-optically scanning the first and second stripe patterns in the main scanning direction to produce a pattern signal of a predetermined resolution corresponding to the first and second stripe patterns;

first movement detection means for detecting, in response to the pattern signal supplied thereto, that the first stripe patterns move in the main scanning direction by a distance corresponding to relative movement of said scanning section relative to the original by a predetermined distance in the subscanning direction to produce a first movement detection signal;

second movement detection means for detecting, in response to the pattern signal supplied thereto, movement of the second stripe patterns in the main scanning direction when the direction of the movement of said scanning section is deflected from the subscanning direction to produce relative movement with respect to the original by a distance greater than a predetermined distance in the main scanning direction to produce a second movement detection signal;

inclination detection means for measuring, in response to the pattern signal supplied thereto, the distance between of the first stripe patterns to detect an inclination of said linear array with respect to the main scanning direction to produce an inclination signal;

storage control means for storing the image data signals into a buffer memory for each of the main scanning periods; and corrected image data production means for producing, in response to the first and second movement detection signals, corrected image data corresponding to the distances of relative movement in the subscanning direction and the main scanning direction from the image data signals stored in said buffer memory.

19. An image reading apparatus as claimed in claim 18, further comprising a hand scanner which includes said scanning section including said pattern signal production means, said movement detection means, said storage control means and said corrected data production means and operable by hand to effect relative movement in the subscanning direction, and said table sheet.

20. An image reading apparatus as claimed in claim 19, wherein said table sheet is provided with a center line which is the second stripe pattern and disposed at a central portion of the original area, and further with a start line formed from a black line of a predetermined width disposed in parallel to the main scanning direction and serving as a reference line for starting of the subscanning, and two first stripe patterns each are disposed on the opposite sides of the center line, and said hand scanner includes said scanning section having a length sufficient to scan, by main scanning, the first stripe patterns on the left or the right of the center line including the center line.

* * * * *